US012362459B2

(12) United States Patent
Yoon et al.

(10) Patent No.: US 12,362,459 B2
(45) Date of Patent: Jul. 15, 2025

(54) ELECTRONIC DEVICE COMPRISING ANTENNA

(71) Applicant: Samsung Electronics Co., Ltd., Suwon-si (KR)

(72) Inventors: Shinho Yoon, Suwon-si (KR); Myeongjun Kong, Suwon-si (KR); Dongjun Oh, Suwon-si (KR); Seunghwan Kim, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 18/168,898

(22) Filed: Feb. 14, 2023

(65) Prior Publication Data

US 2023/0198130 A1 Jun. 22, 2023

Related U.S. Application Data

(63) Continuation of application No. PCT/KR2022/012428, filed on Aug. 19, 2022.

(30) Foreign Application Priority Data

Aug. 20, 2021 (KR) ........................ 10-2021-0110209

(51) Int. Cl.
*H01Q 1/24* (2006.01)
*H01Q 1/48* (2006.01)
(Continued)

(52) U.S. Cl.
CPC ............... *H01Q 1/243* (2013.01); *H01Q 1/48* (2013.01); *H01Q 5/307* (2015.01); *H01Q 13/106* (2013.01)

(58) Field of Classification Search
CPC ........ H01Q 1/243; H01Q 1/48; H01Q 13/106; H01Q 13/10; H01Q 1/38; H01Q 5/35; H01Q 5/307; H04M 1/026
See application file for complete search history.

(56) References Cited

U.S. PATENT DOCUMENTS 10,629,982 B2 4/2020 Kim et al.
10,776,187 B2 9/2020 Sharifi et al.
(Continued)

FOREIGN PATENT DOCUMENTS

CN 108281763 A 7/2018
EP 3035441 A1 * 6/2016 ............. H01Q 1/243
(Continued)

OTHER PUBLICATIONS

Shu-Chuan Chen et al., LTE MIMO Closed Slot Antenna System for Laptops with a Metal Cover, Mar. 1, 2019, IEEE, vol. 7 (Year: 2019).*
(Continued)

*Primary Examiner* — Graham P Smith
(74) *Attorney, Agent, or Firm* — Jefferson IP Law, LLP

(57) ABSTRACT

An electronic device is provided. The electronic device includes a first conductive frame, a second conductive frame, a split portion, a conductive structure disposed inside the electronic device, a first conductive member, and a wireless communication circuit electrically connected to the first conductive frame, the second conductive member, a conductive portion, and the first conductive member, and the second conductive member, wherein the wireless communication circuit may be configured to transmit and/or receive a radio signal by using at least a portion of an electric path provided by the first conductive frame, the first conductive member, the second conductive member, the conductive portion, and the conductive structure by feeding power to the
(Continued)

first conductive member and/or the second conductive member.

20 Claims, 40 Drawing Sheets

(51) Int. Cl.

| | |
|---|---|
| ***H01Q 5/307*** | (2015.01) |
| ***H01Q 13/10*** | (2006.01) |

(56) References Cited

U.S. PATENT DOCUMENTS

| | | | | |
|---|---|---|---|---|
| 10,819,834 | B2 | 10/2020 | Jung et al. | |
| 10,910,697 | B2 | 2/2021 | Kim et al. | |
| 2014/0266945 | A1 | 9/2014 | Dou | |
| 2014/0292584 | A1 | 10/2014 | Lin | |
| 2015/0270619 | A1 | 9/2015 | Zhu et al. | |
| 2015/0311594 | A1 | 10/2015 | Zhu et al. | |
| 2017/0346164 | A1 | 11/2017 | Kim et al. | |
| 2018/0183137 | A1* | 6/2018 | Tsai | H04M 1/026 |
| 2018/0358699 | A1* | 12/2018 | Li | H01Q 9/42 |
| 2019/0356040 | A1* | 11/2019 | Kim | H01Q 9/42 |
| 2020/0334030 | A1 | 10/2020 | Crane et al. | |
| 2020/0350939 | A1 | 11/2020 | Lee et al. | |
| 2020/0358198 | A1* | 11/2020 | Hsu | H01Q 1/44 |
| 2021/0151861 | A1 | 5/2021 | Chen et al. | |
| 2022/0103668 | A1 | 3/2022 | Kim et al. | |
| 2022/0173502 | A1 | 6/2022 | Han et al. | |

FOREIGN PATENT DOCUMENTS

| | | | |
|---|---|---|---|
| KR | 10-1566617 | B1 | 11/2015 |
| KR | 10-2017-0133952 | A | 12/2017 |
| KR | 10-2019-0090870 | A | 8/2019 |
| KR | 10-2019-0110141 | A | 9/2019 |
| KR | 10-2019-0131112 | A | 11/2019 |
| KR | 10-2020-0119107 | A | 10/2020 |
| WO | 2020/166821 | A1 | 8/2020 |

OTHER PUBLICATIONS

International Search Report dated Nov. 22, 2022, issued in International Patent Application No. PCT/KR2022/012428.

Extended European Search Report dated Sep. 12, 2024, issued in European Application No. 22858803.4-1201.

* cited by examiner

ELECTRONIC DEVICE COMPRISING ANTENNA

CROSS-REFERENCE TO RELATED APPLICATION(S)

This application is a continuation application, claiming priority under § 365 (c), of an International application No. PCT/KR2022/012428, filed on Aug. 19, 2022, which is based on and claims the benefit of a Korean patent application number 10-2021-0110209, filed on Aug. 20, 2021, in the Korean Intellectual Property Office, the disclosure of which is incorporated by reference herein in its entirety.

TECHNICAL FIELD

The disclosure relates to an electronic device including an antenna.

BACKGROUND ART

An electronic device may include a plurality of antennas to provide various wireless communications for various services.

A portion of a housing constituting the exterior of the electronic device may be formed of a metal frame, and the metal frame may receive power to operate as an antenna radiator.

Meanwhile, in recent years, electronic devices have been released in a deformable form such as a foldable type or a rollable type, as well as a bar type.

The above information is presented as background information only to assist with an understanding of the disclosure. No determination has been made, and no assertion is made, as to whether any of the above might be applicable as prior art with regard to the disclosure.

DISCLOSURE

Technical Problem

When an electronic device includes a plurality of antennas, antennas operating at different resonant frequencies may be disposed adjacent to each other, which may cause interference therebetween.

For example, in a foldable type electronic device, since a radio frequency integrated circuit (RFIC) is concentrated in one folder portion, interference between antennas may be caused, and in a rollable type electronic device, interference may be caused since the antennas are mainly included in a fixed portion.

Aspects of the disclosure are to address at least the above-mentioned problems and/or disadvantages and to provide at least the advantages described below. Accordingly, an aspect of the disclosure is to provide a device for reducing interference and performing wireless communication in a plurality of frequency bands when a plurality of antennas are disposed adjacent to each other.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first conductive frame forming a first edge of the electronic device, a second conductive frame that configures a second edge perpendicular to the first edge, a split portion provided at one end of the first edge to electrically separate the first conductive frame and the second conductive frame from each other, wherein the split portion extends along the second edge in a direction perpendicular to the first edge, a conductive structure disposed inside the electronic device, a first conductive member spaced apart from the first conductive frame and the second conductive frame and disposed along the first edge, a second conductive member spaced apart from the first conductive frame and the first conductive member and disposed along the first edge, a conductive portion extending from a point of the first conductive frame or the conductive structure and located between the first conductive member and the second conductive member, and a wireless communication circuit electrically connected to the first conductive member and the second conductive member, wherein the wireless communication circuit may be configured to transmit and/or receive a radio signal by using at least a portion of an electric path provided by the first conductive frame, the first conductive member, the second conductive member, the conductive portion, and the conductive structure by feeding power to the first conductive member and/or the second conductive member.

In accordance with another aspect of the disclosure, an electronic device is provided. The electronic device includes a first conductive frame forming a first edge of the electronic device, a second conductive frame that configures a second edge perpendicular to the first edge, a split portion provided at one end of the first edge to electrically separate the first conductive frame and the second conductive frame from each other, wherein the split portion extends along the second edge in a direction perpendicular to the first edge, a conductive structure disposed inside the electronic device, a first conductive member spaced apart from the first conductive frame and the second conductive frame and disposed along the first edge, a first slot surrounding the first conductive member, a second conductive member spaced apart from the first conductive frame and the first conductive member and disposed along the first edge, a second slot surrounding the second conductive member, a conductive portion extending from a point of the first conductive frame or the conductive structure and located between the first conductive member and the second conductive member, and a wireless communication circuit electrically connected to the first conductive member and the second conductive member, wherein the wireless communication circuit may be configured to transmit and/or receive a radio signal by using at least one of the first slot or the second slot by feeding power to the first conductive member and/or the second conductive member.

Advantageous Effects

According to various embodiments of the disclosure, it is possible to provide an electronic device that prevents interference between antennas and performs wireless communication in a plurality of frequency bands when a plurality of antennas are disposed adjacent to each other.

Accordingly, it is possible for the electronic device to provide various communication services while maintaining wireless communication performance despite a narrow space included therein.

Furthermore, various embodiments of the disclosure are applicable to a foldable type or a rollable type electronic device.

In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
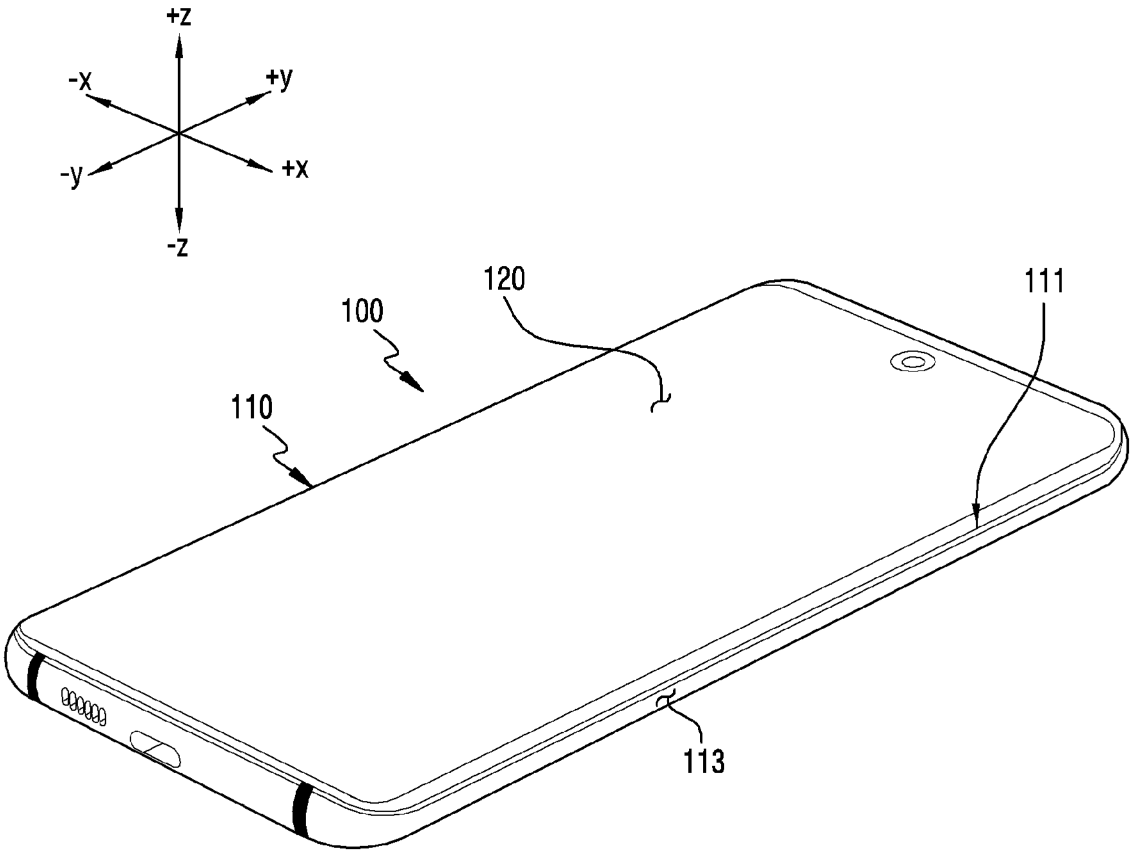
FIG. 1A is a perspective view illustrating a front surface of an electronic device according to an embodiment of the disclosure.
Figure 1B:
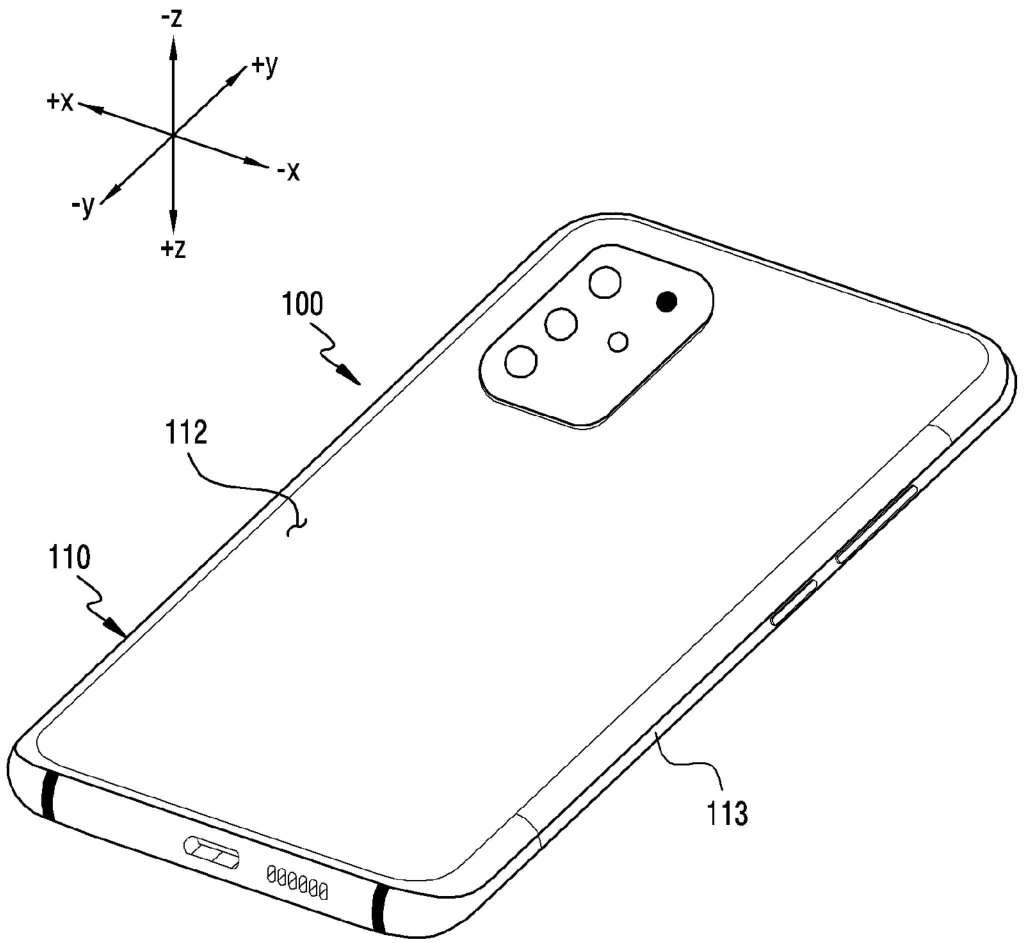
FIG. 1B is a perspective view illustrating a rear surface of an electronic device according to an embodiment of the disclosure.

FIG. 1A is a perspective view illustrating the front surface of an electronic device (e.g., the surface of the electronic device of FIG. 1A located in the +z-direction) according to an embodiment of the disclosure. FIG. 1B is a perspective view illustrating the rear surface of an electronic device (e.g., the surface of the electronic device of FIG. 1B located in the −z-direction) according to an embodiment of the disclosure.

Referring to FIGS. 1A and 1B, an electronic device 100 may include a housing 110, and the housing 110 may include a front plate 111, a rear plate 112, and a side member 113 surrounding the space between the front plate 111 and the rear plate 112.

In an embodiment, a display 120 may be disposed on the front plate 111 of the housing 110. In an example, the display 120 may occupy most of the front surface of the electronic device 100 (e.g., the surface located in the +z-direction of the electronic device 100 of FIG. 1A).

According to an embodiment, the rear plate 112 may be formed of, for example, coated or colored glass, ceramic, polymer, metal (e.g., aluminum, stainless steel (STS), or magnesium), or a combination of two or more of these materials. According to an embodiment, the rear plate 112 may include a curved portion that is bent toward the side member 113 from at least one end and extends seamlessly.

According to an embodiment, the side member 113 may be coupled to the rear plate 112 and may include a metal and/or a polymer. According to an embodiment, the rear plate 112 and the side member 113 may be configured integrally and may include the same material (e.g., a metal material such as aluminum).

According to an embodiment, a conductive portion of the side member 113 may be electrically connected to a wireless communication circuit to operate as an antenna radiator for transmitting and/or receiving a radio frequency (RF) signal of a specific frequency band. According to an embodiment, the wireless communication circuit may transmit an RF signal of the specific frequency band to the conductive portion of the side member 113 or receive an RF signal of the specific frequency band from the conductive portion.

The electronic device 100 illustrated in FIGS. 1A and 1B corresponds to an example and does not limit the shape of the device to which the technical idea disclosed herein is applied. The technical idea disclosed herein is applicable to various user devices including a portion capable of operating as an antenna radiator. For example, by adopting a flexible display and a hinge structure, the technical idea disclosed herein may also be applicable to a foldable electronic device that is foldable in a horizontal direction or a foldable in a vertical direction, a tablet computer, or a notebook computer.

Hereinafter, various embodiments will be described with reference to the electronic device 100 illustrated in FIGS. 1A and 1B for convenience of description.

Figure 2:
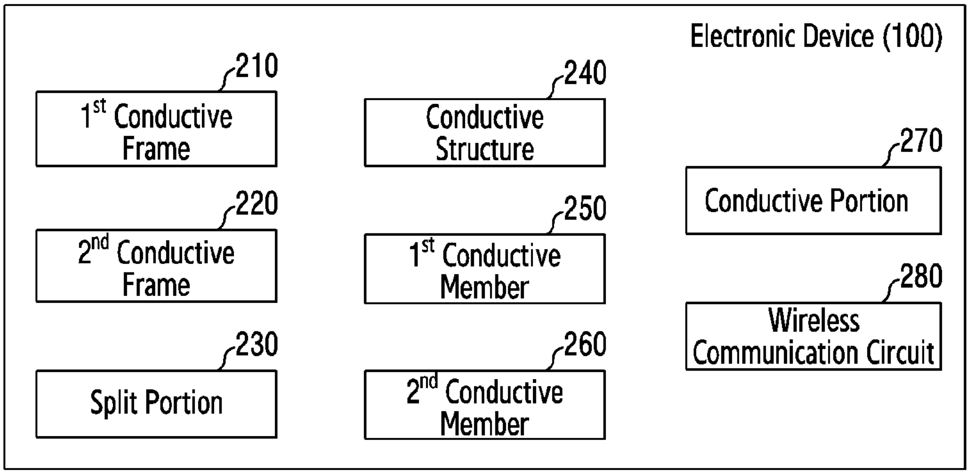
FIG. 2 illustrates a hardware configuration of an electronic device according to an embodiment of the disclosure.

FIG. 2 illustrates a hardware configuration of an electronic device according to an embodiment of the disclosure.

Referring to FIG. 2, an electronic device 100 may include a first conductive frame 210, a second conductive frame 220, a split portion (or a split portion, a slit, or a non-conductive portion) 230, a conductive structure 240, a first conductive member 250, a second conductive member 260, a conductive portion 270, and/or a wireless communication circuit 280.

In another embodiment, the electronic device 100 may further include an additional component in addition to the components illustrated in FIG. 2. For example, the electronic device 100 may further include a third conductive member (not illustrated) or a fourth conductive member (not illustrated).

According to an embodiment, the first conductive frame 210 and the second conductive frame 220 may be understood as at least partial configurations of the side member 113.

According to an embodiment, the split portion 230 may be filled with an insulating member. In an example, the split portion 230 may be filled with a dielectric material having a specific dielectric constant.

According to an embodiment, the wireless communication circuit 280 may be electrically connected to the first conductive member 250 and/or the second conductive member 260.

Figure 3:
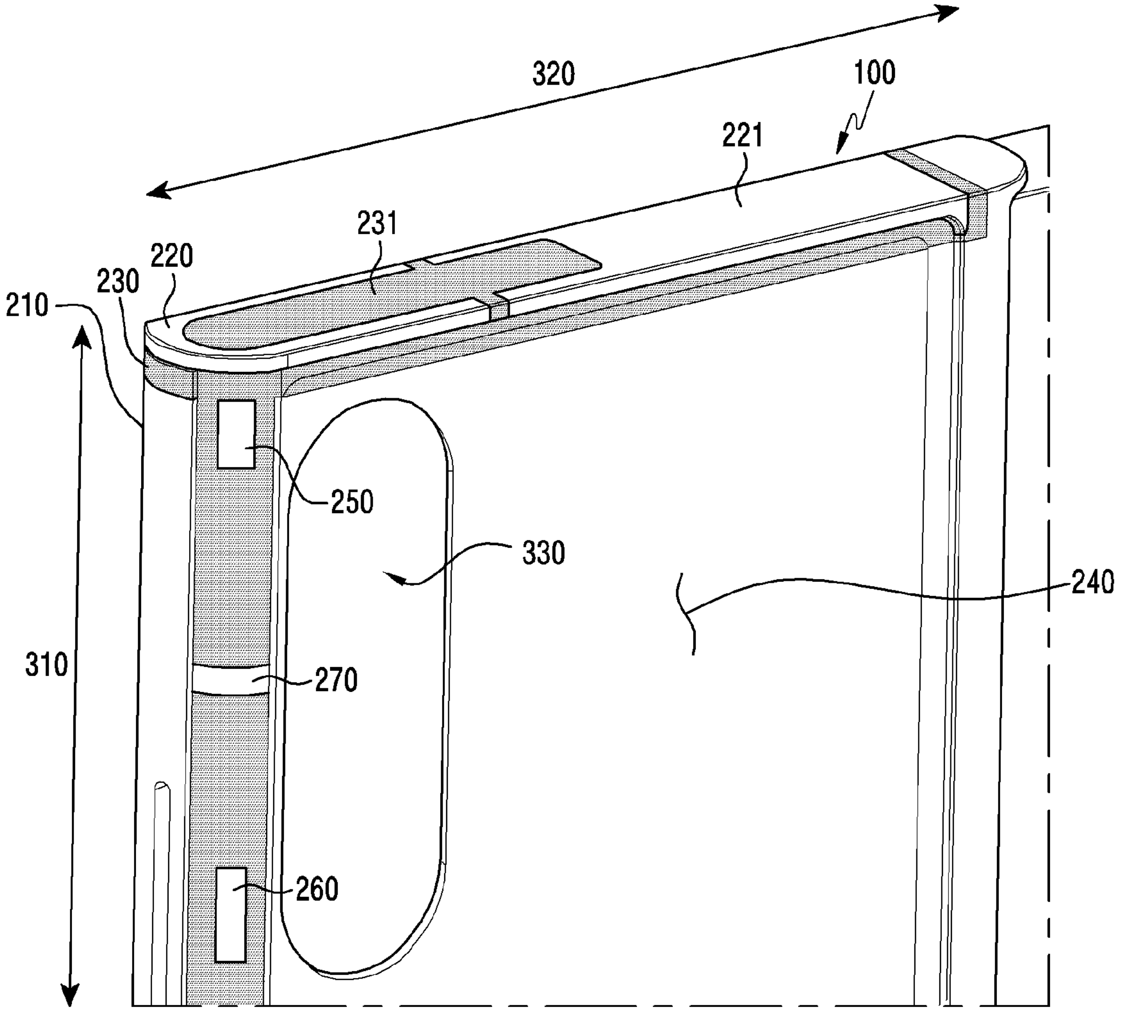
FIG. 3 illustrates an electronic device including a first conductive frame and a second conductive frame according to an embodiment of the disclosure.

FIG. 3 illustrates an electronic device including a first conductive frame and/or a second conductive frame according to an embodiment of the disclosure.

Referring to FIG. 3, an electronic device 100 may include a first conductive frame 210, a second conductive frame 220, a third conductive frame 221, and/or a camera opening 330. In an example, at least a portion of the camera may be exposed to the outside through the camera opening 330.

According to an embodiment, the first conductive frame 210 may form a first edge 310 of the electronic device 100. In an example, the first conductive frame 210 may be a metal frame that configures at least a portion of the side member 113.

According to an embodiment, the second conductive frame 220 and/or the third conductive frame 221 may configure a second edge 320 of the electronic device 100 that is substantially perpendicular to the first edge 310. In an example, the second conductive frame 220 and/or the third conductive frame 221 may be a metal frame that configures at least a portion of the side member 113. In an embodiment, an additional split portion 231 may be provided between the second conductive frame 220 and the third conductive frame 221.

According to an embodiment, the split portion 230 may be provided at one end of the first edge 310 to electrically separate the first conductive frame 210 and the second conductive frame 220 from each other. In an example, the split portion 230 may be provided to be in contact with the second conductive frame 220 that configures the second edge 320. In another example, the split portion 230 may be provided to be spaced apart from the second conductive frame 220 by a specific distance.

According to an embodiment, the split portion 230 may extend along the second edge 320 in a direction perpendicular to the first edge 310. In an example, the split portion 230 may be disposed in parallel with the second conductive frame 220 while being contact with the second conductive frame 220 to electrically separate the inside of the electronic device 100 from the second conductive frame 220. In another example, the split portion 230 may be disposed to be spaced apart from the second conductive frame 220 in parallel with the same by a specific distance.

According to an embodiment, the conductive structure 240 may be disposed inside the electronic device 100. In an example, the conductive structure 240 may correspond to at least a portion of a support member (or a bracket) (not illustrated) disposed inside the electronic device 100.

According to an embodiment, the conductive structure 240 may have various shapes, such as a conductive plate or a conductive stick.

According to an embodiment, the first conductive member 250 may be disposed along the first edge 310 to be spaced apart from the first conductive frame 210 and the second conductive frame 220. In an example, the first conductive member 250 may be disposed to be spaced apart from the first conductive frame 210 by a specific distance, and may also be disposed to be spaced apart from the second conductive frame 220 by a specific distance.

According to an embodiment, the second conductive member 260 may be disposed along the first edge 310 to be spaced apart from the first conductive frame 210 and the first conductive member 250. In an example, the second conductive member 260 may be disposed to be spaced apart from the first conductive frame 210 and the first conductive member 250 by a specific distance.

According to an embodiment, the first conductive member 250 may be surrounded by a dielectric material having a specific dielectric constant. In an example, the first conductive member 250 may be spaced apart from the first conductive frame 210 by being surrounded by the dielectric material having the specific dielectric constant. In another example, one edge of the first conductive member 250 may be in contact with the split portion 230. For example, one edge of the first conductive member 250 is in contact with the split portion 230 and the other edges are surrounded by the dielectric material having the specific dielectric constant, so that the first conductive member 250 may be spaced apart from the first conductive frame 210, the second conductive frame 220, and the second conductive member 260.

According to an embodiment, the second conductive member 260 may be surrounded by a dielectric material having a specific dielectric constant. In an example, the second conductive member 260 may be spaced apart from the first conductive frame 210 and the first conductive member 250 by being surrounded by the dielectric material having the specific dielectric constant.

According to an embodiment, the conductive portion 270 may extend from a point of the first conductive frame 210 or the conductive structure 240, and may be located between the first conductive member 250 and the second conductive member 260. In an example, the conductive portion 270 may be a portion of the first conductive frame 210 that extends from the first conductive frame 210 to the conductive structure 240. In another example, the conductive portion 270 may be a portion of the conductive structure 240 that extends from the conductive structure 240 to the first conductive frame 210.

Figure 4:
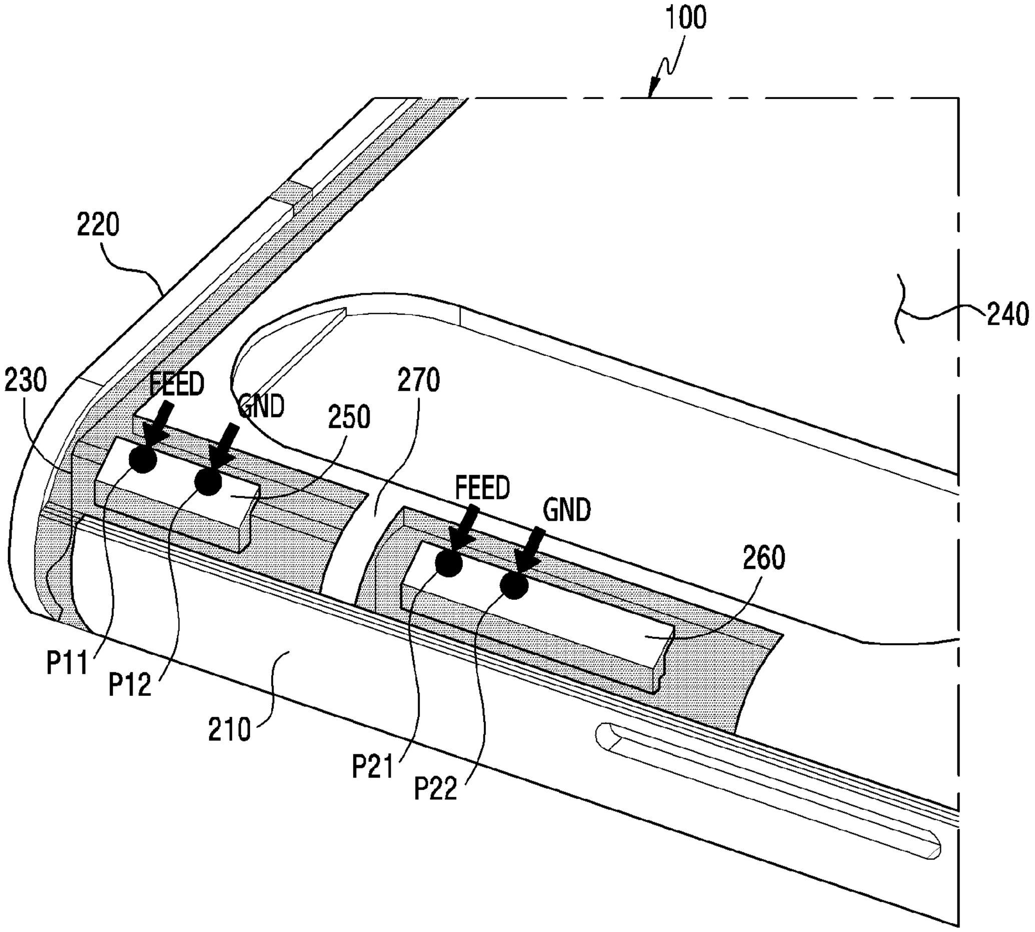
FIG. 4 illustrates an electronic device including a first conductive member and a second conductive member according to an embodiment of the disclosure.

FIG. 4 illustrates an electronic device including a first conductive member and/or a second conductive member according to an embodiment of the disclosure.

Referring to FIG. 4, an electronic device 100 may include a first conductive member 250 and/or a second conductive member 260 including a feeding point and a ground point. Since the first conductive frame 210, the second conductive frame 220, the split portion 230, the conductive structure 240, the first conductive member 250, the second conductive member 260, and the conductive portion 270 illustrated in FIG. 4 are the same as the components illustrated in FIG. 3, a separate description thereof will be omitted.

According to an embodiment, a first feeding point P11 and a first ground point P12 may be located on the first conductive member 250. In an example, a wireless communication circuit 280 may feed power to the first conductive member 250 via the first feeding point P11, and an electric path may be provided from the first feeding point P11 to the first ground point P12.

According to an embodiment, a second feeding point P21 and a second ground point P22 may be located on the second conductive member 260. In an example, the wireless communication circuit 280 may feed power to the second conductive member 260 via the second feeding point P21, and an electric path may be provided from the second feeding point P21 to the second ground point P22.

Figure 5A:
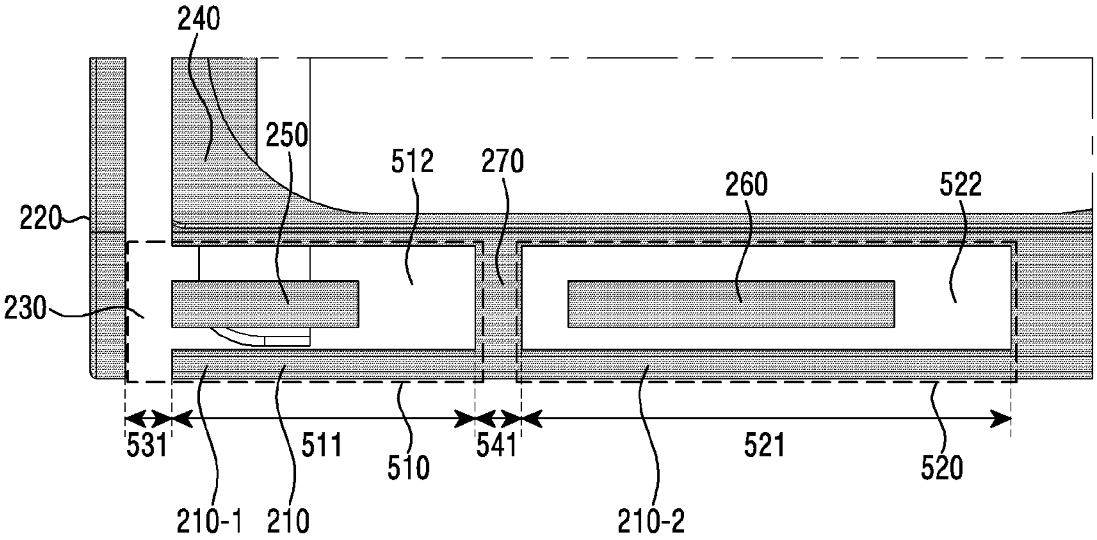
FIG. 5A illustrates a first antenna and a second antenna according to an embodiment of the disclosure.

FIG. 5A illustrates a first region and a second region according to an embodiment of the disclosure.

Referring to FIG. 5A, a first region 510 and a second region 520 may be provided along a first conductive frame 210.

According to an embodiment, the first region 510 may include a first portion 210-1 of the first conductive frame 210, the first conductive member 250, and/or a first slot (or an opening or a non-conducting member) 512. In an example, the first slot 512 may be provided to surround three edges of the first conductive member 250.

According to an embodiment, a non-conductive member may be disposed in the first slot 512. In an example, the first slot 512 may be filled with a dielectric material having a specific dielectric constant.

According to an embodiment, the first region 510 including the first slot 512 may receive power from the wireless communication circuit 280 to operate as an antenna (e.g., a slot antenna or an open slot). In an example, when the wireless communication circuit 280 feeds power to the first conductive member 250, the first conductive frame 210 may be fed with power through coupling, and may operate as an antenna radiator by a resonance formed around the first slot 512.

According to an embodiment, the second region 520 may include a second portion 210-2 of the first conductive frame 210, a second conductive member 260, and/or a second slot 522. In an example, the second slot 522 may be provided to surround four edges of the second conductive member 260.

According to an embodiment, a non-conductive member may be disposed in the second slot 522. In an example, the second slot 522 may be filled with a dielectric material having a specific dielectric constant.

According to an embodiment, the second region 520 including the second slot 522 may receive power from the wireless communication circuit 280 to operate as an antenna (e.g., a slot antenna or a closed slot). In an example, when the wireless communication circuit 280 feeds power to the second conductive member 260, the first conductive frame 210 may be fed with power through coupling, and may operate as an antenna radiator by a resonance formed around the second slot 522.

According to an embodiment, the first slot 512 may have a width in a first range 511. In an example, the first range 511 may be changed based on the resonance frequency of the first slot 512.

According to an embodiment, the second slot 522 may have a width in a second range 521. In an example, the second range 521 may be changed based on the resonance frequency of the second slot 522. In another example, the length of the second conductive member 260 should be at least about 50% or more of the width in the second range 521 to generate sufficient coupling between the second conductive member 260 and the second slot 522, so that a resonance may occur.

According to an embodiment, the split portion 230 may have a width in a third range 531. In an example, the third range 531 may be variable depending on the position of the split portion 230. For example, when the first conductive frame 210 and the second conductive frame 220 are disposed close to each other because the third range 531 has a small value, a strong electric field (E-field) may be generated in the split portion 230.

For example, the value in the third range 531 may increase toward the first conductive frame 210.

According to an embodiment, the conductive portion 270 may have a width in a fourth range 541. In an example, the fourth range 541 may correspond to a value of about 5 mm or less. For example, the fourth range 541 may correspond to a value in the range of about 1 mm to about 2 mm.

According to an embodiment, since the capacitance value of the first slot 512 changes depending on the distance between the first conductive member 250 and the first portion 210-1 of the first conductive frame 210, the resonance frequency of the first slot 512 may vary. In an example, the distance between the first conductive member 250 and the first portion 210-1 of the first conductive frame 210 may correspond to a value in the range of about 0.5 millimeters (mm) to about 2.5 mm. For example, the distance between the first conductive member 250 and the first conductive frame 210 may be about 1 mm to about 2 mm.

According to an embodiment, the electronic device may adjust the resonance frequency of the first slot 512 by adjusting the length of the first conductive member 250.

According to an embodiment, when the first conductive member 250 is located adjacent to the split portion 230, a large amount of radiation current may be formed in the split portion 230 due to the characteristics of the open slot antenna. In addition, due to this, electromagnetic waves formed by the first slot 512 may be more easily radiated through at least a portion of the split portion 230. In an example, since the split portion 230 is located on one side surface of the electronic device 100, the electromagnetic waves formed by the first slot 512 may be easily radiated to the outside of the electronic device 100.

According to an embodiment, radiation efficiency may be further improved since antenna radiation is performed through the slot between the split portion 230 and the first conductive member 250.

Figure 5B:
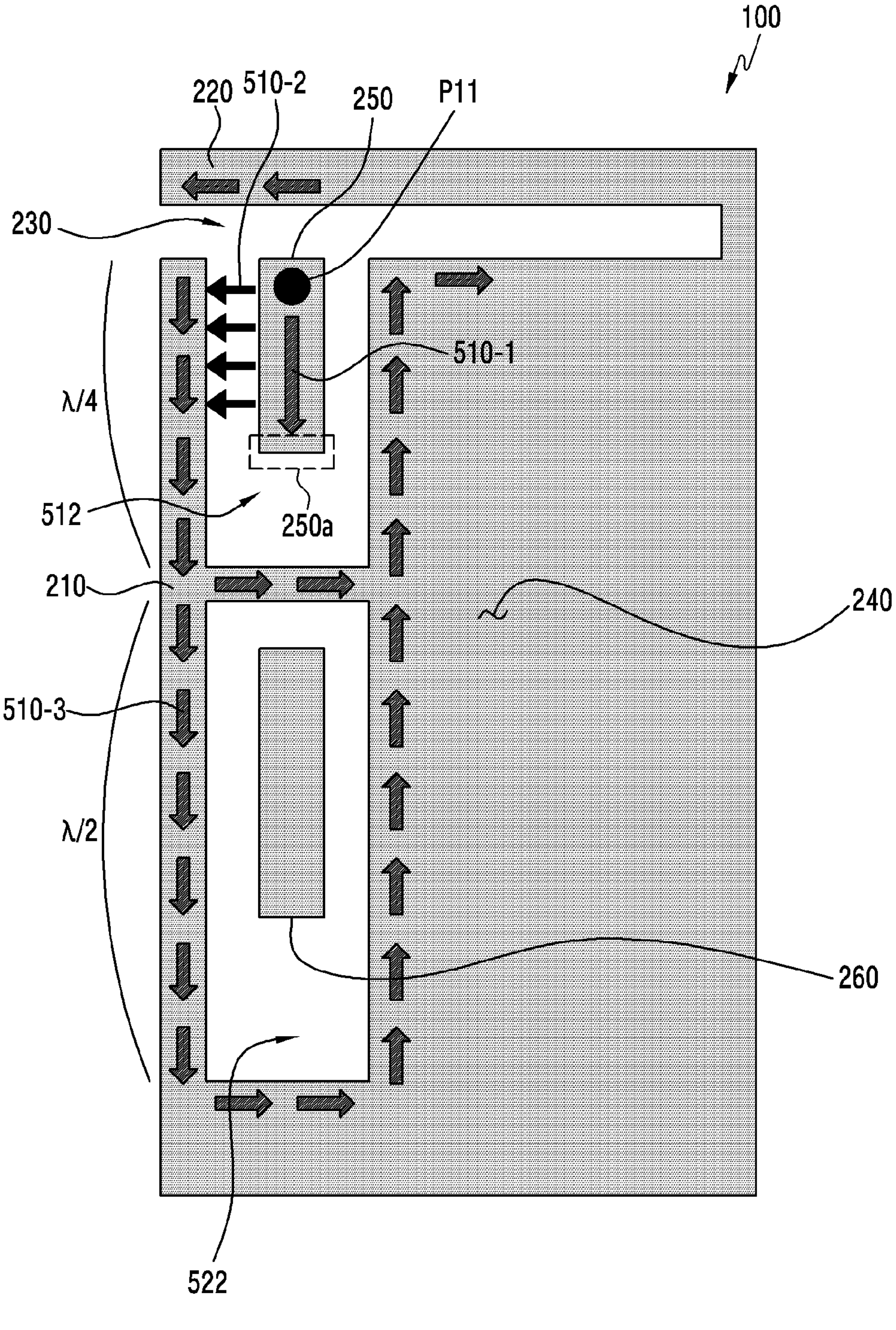
FIG. 5B illustrates flows of current formed in a first region and a second region when power is fed to a first feeding point of a first conductive member according to an embodiment of the disclosure.
Figure 5C:
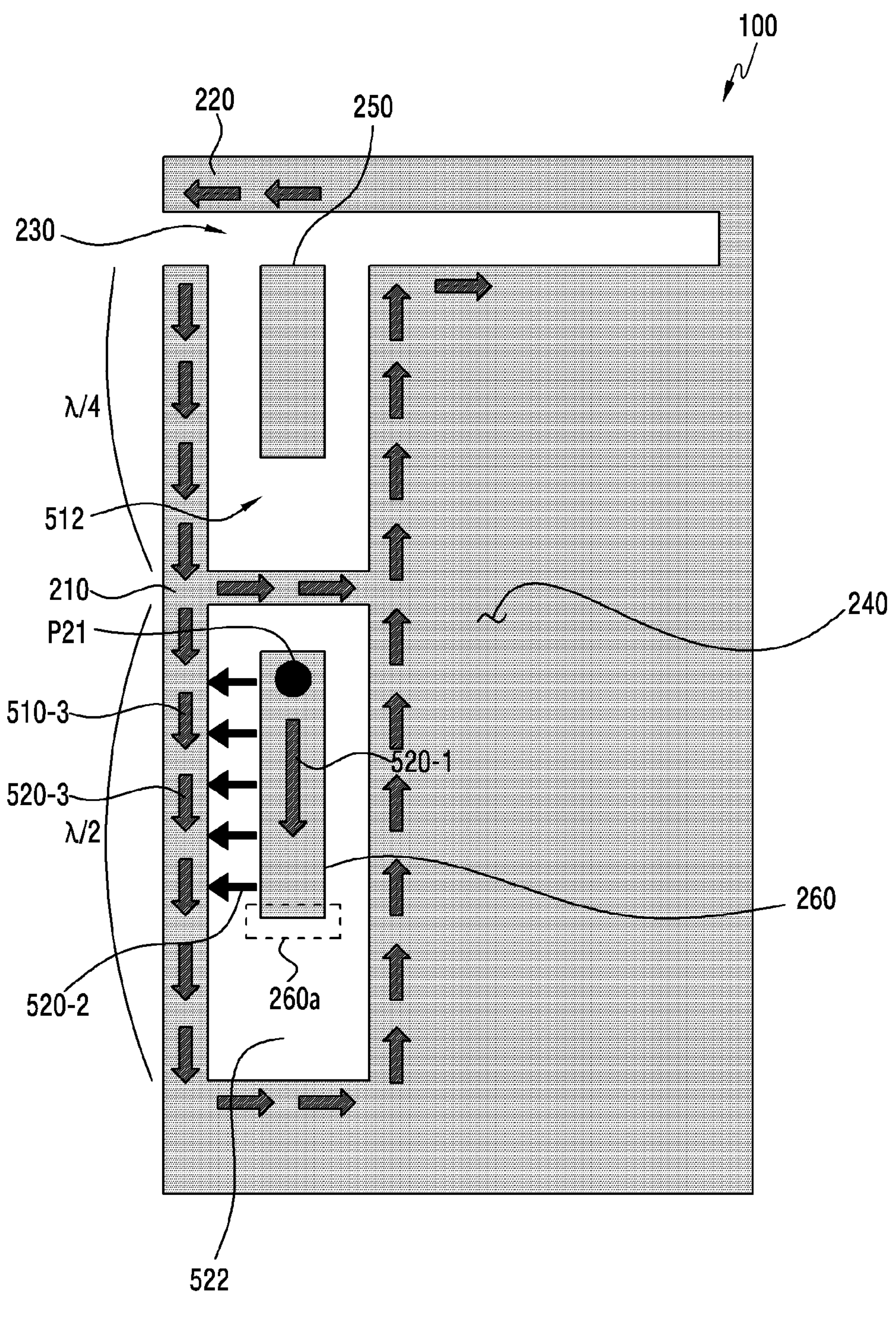
FIG. 5C illustrates flows of current formed in a first region and a second region when power is fed to a second feeding point of a second conductive member according to an embodiment of the disclosure.

FIG. 5B illustrates a flow of current formed in a first region and a second region when power is fed to a first feeding point P11 of a first conductive member according to an embodiment of the disclosure. FIG. 5C illustrates a flow of current formed in the first region and the second region when power is fed to a second feeding point of a second conductive member according to an embodiment of the disclosure.

Referring to FIGS. 5B and 5C, when a wireless communication circuit 280 feeds power to a first feeding point P11 or a second feeding point P21, a flow of current may be formed along the conductive materials provided in the first region 510 and/or the second region 520.

According to an embodiment, when the wireless communication circuit 280 feeds power to the first feeding point P11, a first flow of current 510-1 from the first feeding point P11 to a first end 250*a* of the first conductive member 250 may be formed.

According to an embodiment, first coupling (or inductive coupling) 510-2 may be provided by the first flow of current 510-1. In an example, a magnetic field may be changed around the first conductive member 250 by the first flow of current 510-1, and the changed magnetic field forms induced current in at least a portion of the first conductive frame 210. Thus, first coupling 510-2 may be formed between the first conductive member 250 and the first conductive frame 210.

According to an embodiment, when power is fed to at least a portion of the first conductive frame 210 by the first coupling 510-2, a second flow of current 510-3 may be formed along the conductive material provided in the first region 510 or the second region 520. In an example, when power is fed to at least a portion of the first conductive frame 210 through coupling, the second flow of current 510-3 may be formed along at least a portion of the first conductive frame 210, the conductive portion 270, and/or the second conductive frame 220. Due to this, a resonance in which the length of the first slot 512 is ¼ of the wavelength thereof may be formed in the first region 510, and a resonance in which the length of the second slot 522 is ½ of the wavelength thereof may be formed in the second region 520.

According to an embodiment, when the wireless communication circuit 280 feeds power to the second feeding point P21, a third flow of current 520-1 from the second feeding point P21 to a first end 260*a* of the second conductive member 260 may be formed.

According to an embodiment, second coupling (or inductive coupling) 520-2 may be provided by the third flow of current 520-1. In an example, a magnetic field may be changed around the second conductive member 260 by the third flow of current 520-1, and the changed magnetic field forms induced current in at least a portion of the first conductive frame 210. Thus, second coupling 520-2 may be formed between the second conductive member 260 and the first conductive frame 210.

According to an embodiment, when power is fed to at least a portion of the first conductive frame 210 by the second coupling 520-2, a fourth flow of current 520-3 may be formed along the conductive material provided in the first region 510 or the second region 520. In an example, when power is fed to at least a portion of the first conductive frame 210 through coupling, the fourth flow of current 520-3 may be formed along at least a portion of the first conductive frame 210, the conductive portion 270, or the second conductive frame 220. Due to this, a resonance in which the length of the first slot 512 is ¼ of the wavelength thereof may be formed in the first region 510, and a resonance in which the length of the second slot 522 is ½ of the wavelength thereof may be formed in the second region 520.

According to an embodiment, when the length of the second conductive member 260 is equal to or greater than half the length of the second slot 522 (e.g., the width in the second range 521), the second coupling 520-2 may be formed better. In an example, when the length of the second conductive member 260 is longer than half the width in the second range 521, coupling feeding from the second conductive member 260 to the first conductive frame 210 occurs better. Thus, the fourth flow of current 520-3 may be formed better along at least a portion of the first conductive frame 210, the conductive portion 270, or the second conductive frame 220.

Figure 6:
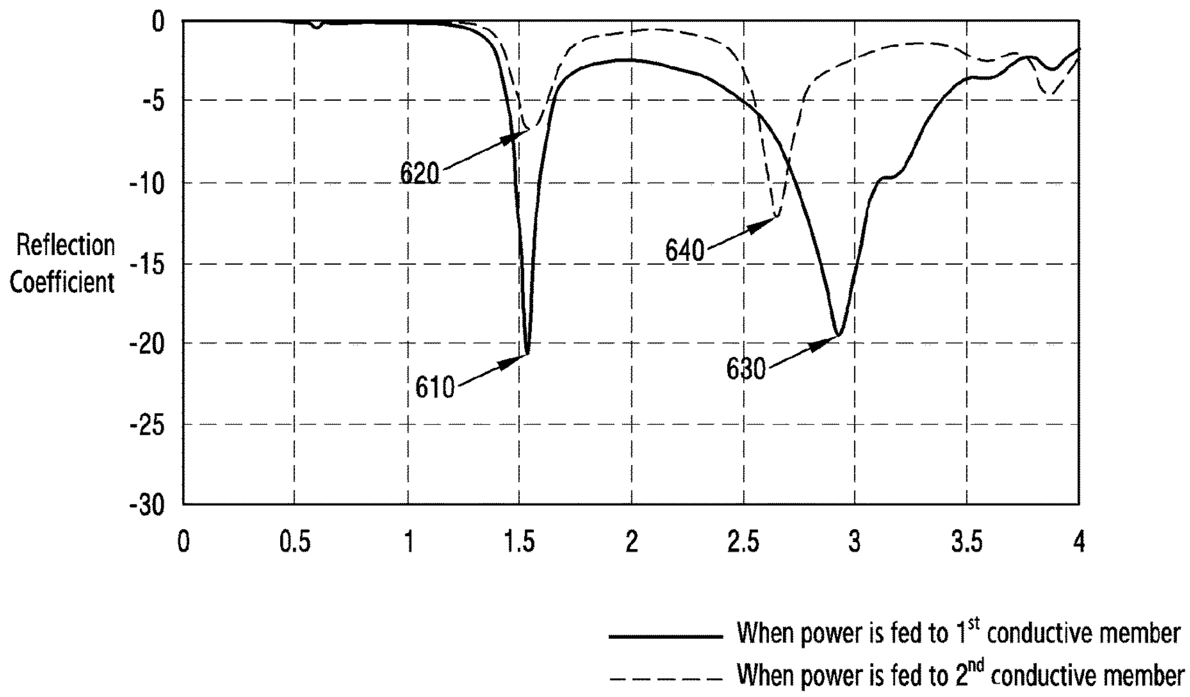
FIG. 6 is a graph illustrating reflection coefficients according to resonances generated by a first antenna and a second antenna according to an embodiment of the disclosure.

FIG. 6 is a graph illustrating reflection coefficients according to resonances generated by a first slot and a second slot according to an embodiment of the disclosure. FIG. 6 may be understood as a graph relating to resonances generated by the flows of current and of FIG. 5B or the flows of current and of FIG. 5C.

Referring to FIG. 6, it can be understood that a resonance occurs at a point where the reflection coefficient has a minimum value.

According to an embodiment, when the wireless communication circuit 280 feeds power to the first conductive member 250, a first resonance 610 may occur in the first region 510 by the first slot 512, and a second resonance 620 may be formed in the second region 520 since the first resonance 610 is projected onto the second region 520.

According to an embodiment, when the wireless communication circuit 280 feeds power to the second conductive member 260, resonances may occur in the split portion 230 and the second region 520 by the second slot 522, and a third resonance 630 may occur in the first region 510 since the above-mentioned resonances are projected onto the first region 510.

According to an embodiment, when the wireless communication circuit 280 feeds power to the second conductive member 260, a fourth resonance 640 may occur in the second region 520 by the second slot 522.

According to an embodiment, in the first region 510, the first resonance 610 may occur in a frequency band of about 1.5 gigahertz (GHz).

According to an embodiment, in the second region 520, the second resonance 620 may occur in a frequency band of about 1.5 GHz.

According to an embodiment, in the first region 510, the third resonance 630 may occur in a frequency band of about 2.8 GHz to 3 GHz.

According to an embodiment, in the second region 520, the fourth resonance 640 may occur in a frequency band of about 2.5 GHz to 2.7 GHZ.

Figure 7A:
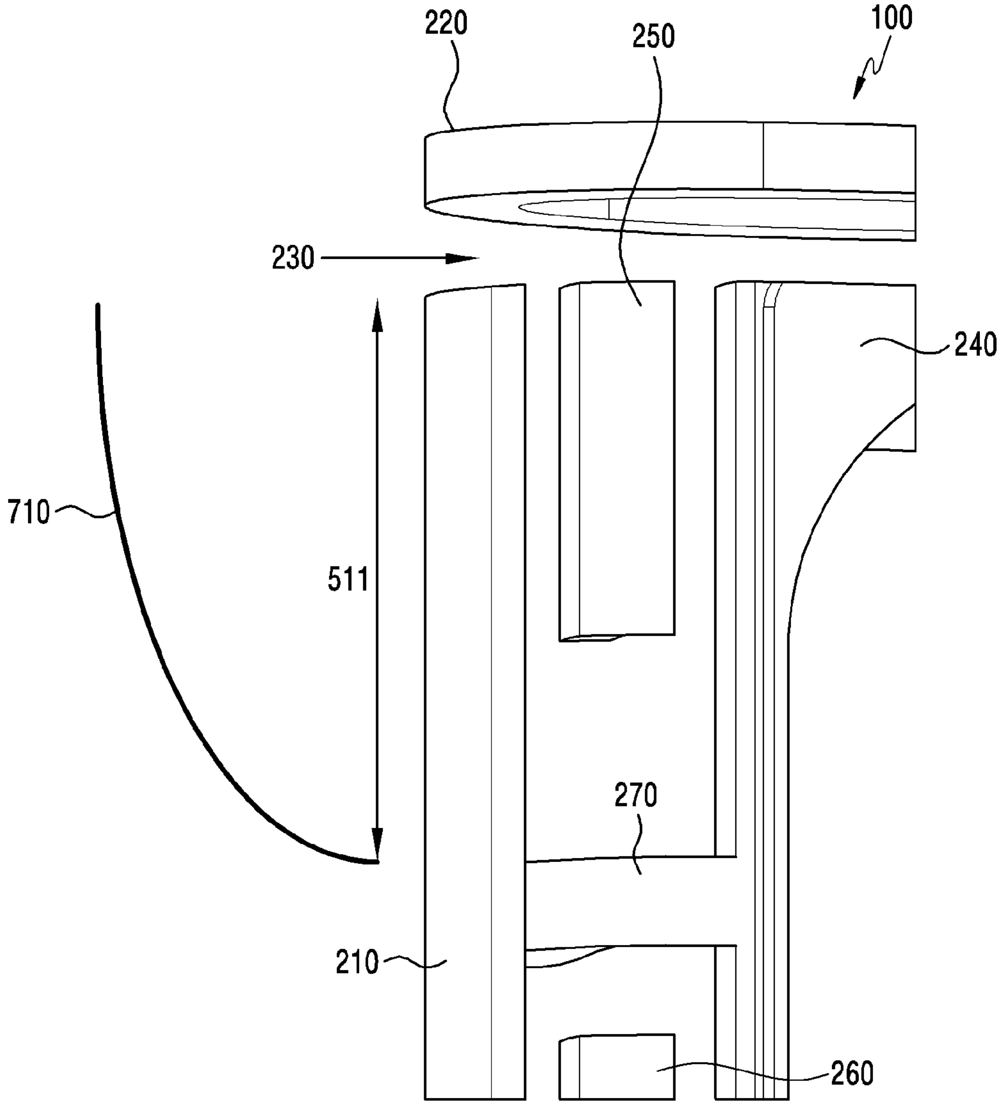
FIG. 7A illustrates a resonance occurring in a first antenna according to an embodiment of the disclosure.
Figure 7B:
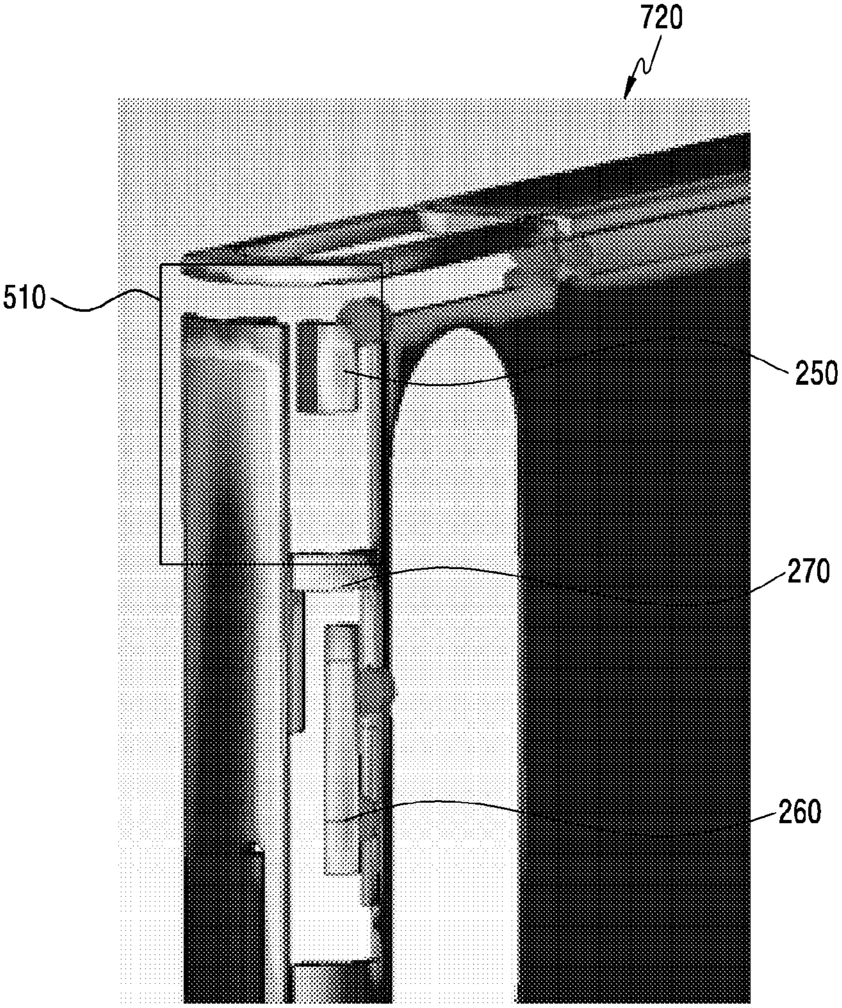
FIG. 7B illustrates an energy distribution formed in an electronic device when a first resonance occurs according to an embodiment of the disclosure.
Figure 7C:
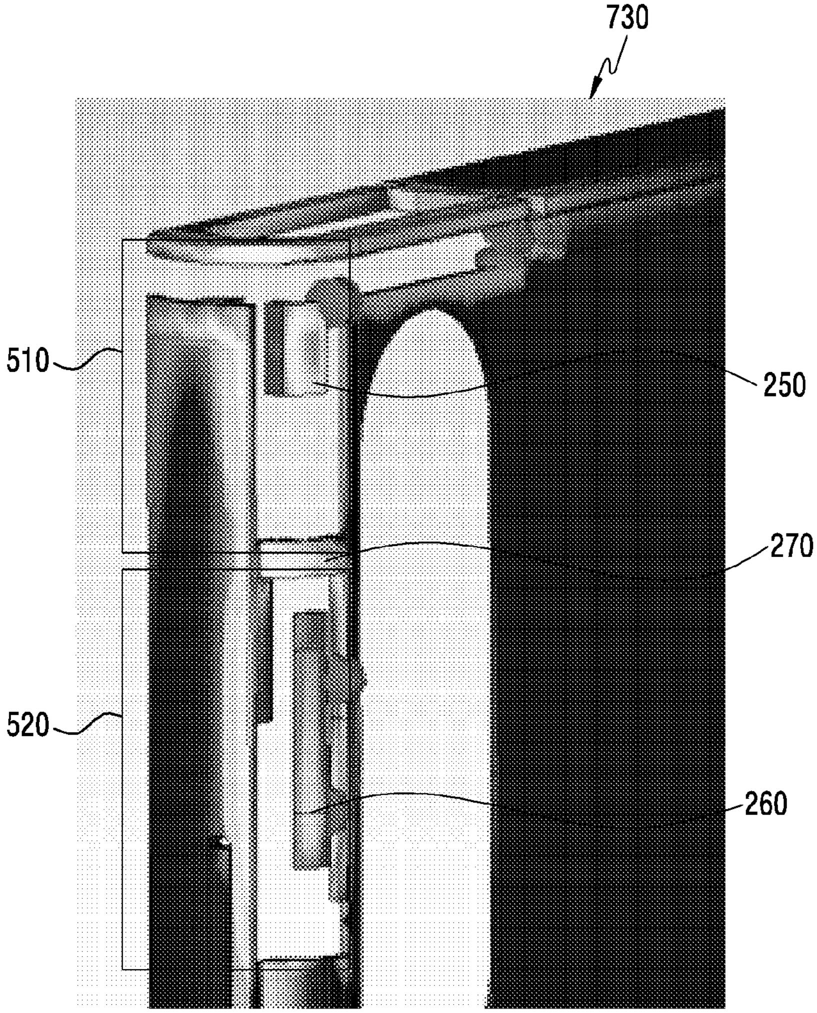
FIG. 7C illustrates an energy distribution formed in an electronic device when a second resonance occurs according to an embodiment of the disclosure.

FIG. 7A illustrates a resonance occurring in a first region according to an embodiment of the disclosure. FIG. 7B illustrates an energy distribution formed in an electronic device when a first resonance occurs in the first region according to an embodiment of the disclosure. FIG. 7C illustrates an energy distribution formed in an electronic device when a second resonance occurs in the first region according to an embodiment of the disclosure.

Referring to FIGS. 7A, 7B, and 7C, when a resonance having a first voltage distribution 710 occurs in a first region 510 according to an embodiment, a first resonance 610 and a second resonance 620 may occur.

According to an embodiment, the first voltage distribution 710 may be formed by the first slot 512 and the split portion 230. In an example, the first voltage distribution 710 may have zero or a minimum value at one end of the first conductive frame 210 that is in contact with the conductive portion 270. In an example, the first voltage distribution 710 may have a maximum value at one end of the first conductive frame 210 that is in contact with the split portion 230.

According to an embodiment, the wireless communication circuit 280 may transmit and/or receive a radio signal in the resonance frequency band of the first resonance 610 or the resonance frequency band of the second resonance 620 by feeding power to the first conductive member 250 or the second conductive member 260. In an example, the first slot 512 may operate as a multi-band antenna having the resonance frequency band of the first resonance 610 and the resonance frequency band of the second resonance 620. For example, when the wireless communication circuit 280 feeds power to the first conductive member 250, the first resonance 610 having a resonance frequency of a frequency band of about 1.6 GHz may occur in the first region 510, and the wireless communication circuit 280 may transmit and/or receive a radio signal in a frequency band of about 1.6 GHZ. As another example, when the wireless communication circuit 280 feeds power to the second conductive member 260, the second resonance 620 having a resonance frequency of a frequency band of about 1.6 GHz may occur in the first region 510, and the wireless communication circuit 280 may transmit and/or receive a radio signal in a frequency band of about 1.6 GHz.

According to an embodiment, the wireless communication circuit 280 may transmit and/or receive a radio signal in the resonance frequency band of the first resonance 610 and the resonance frequency band of the third resonance 630 by being connected to the first conductive member 250.

According to an embodiment, when the first resonance 610 occurs in the first region 510, an energy distribution may be formed in the electronic device 100 in the same form as an energy distribution 720.

According to an embodiment, when the second resonance 620 occurs in the first region 510, an energy distribution may be formed in the electronic device 100 in the same form as an energy distribution 730.

Figure 8:
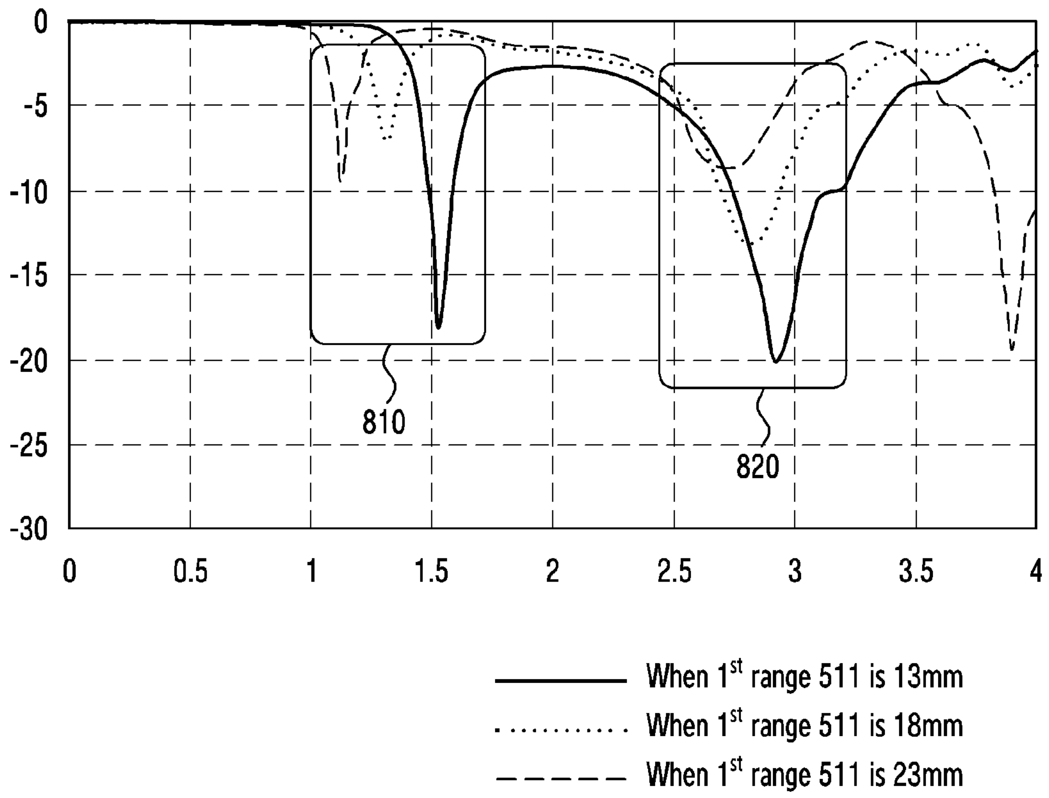
FIG. 8 is a graph illustrating a reflection coefficient according to a resonance formed in an electronic device according to a change of length in a first slot according to an embodiment of the disclosure.

FIG. 8 is a graph illustrating reflection coefficients according to resonances occurring in an electronic device depending on a change of length in a first slot according to an embodiment of the disclosure.

Referring to FIG. 8, when a first slot 512 is provided in a first range 511 of different values, the resonances occurring in a first region 510 may occur in different frequency bands.

According to an embodiment, when the first range 511 of the width of the first slot 512 is about 13 mm, the electronic device 100 may resonate in a frequency band of about 1.5 GHz to about 1.6 GHz.

According to an embodiment, when the first range 511 of the width of the first slot 512 is about 18 mm, the electronic device 100 may resonate in a frequency band of about 1.2 GHz to about 1.5 GHz.

According to an embodiment, when the first range 511 of the width of the first slot 512 is about 23 mm, the electronic device 100 may resonate in a frequency band of about 1 GHz to about 1.2 GHz.

Based on the graph of FIG. 8 according to an embodiment, when the first range 511 of the value of the width of the first slot 512 increases in the range of about 10 mm to about 25 mm, the resonance frequency band may decrease.

Figure 9A:
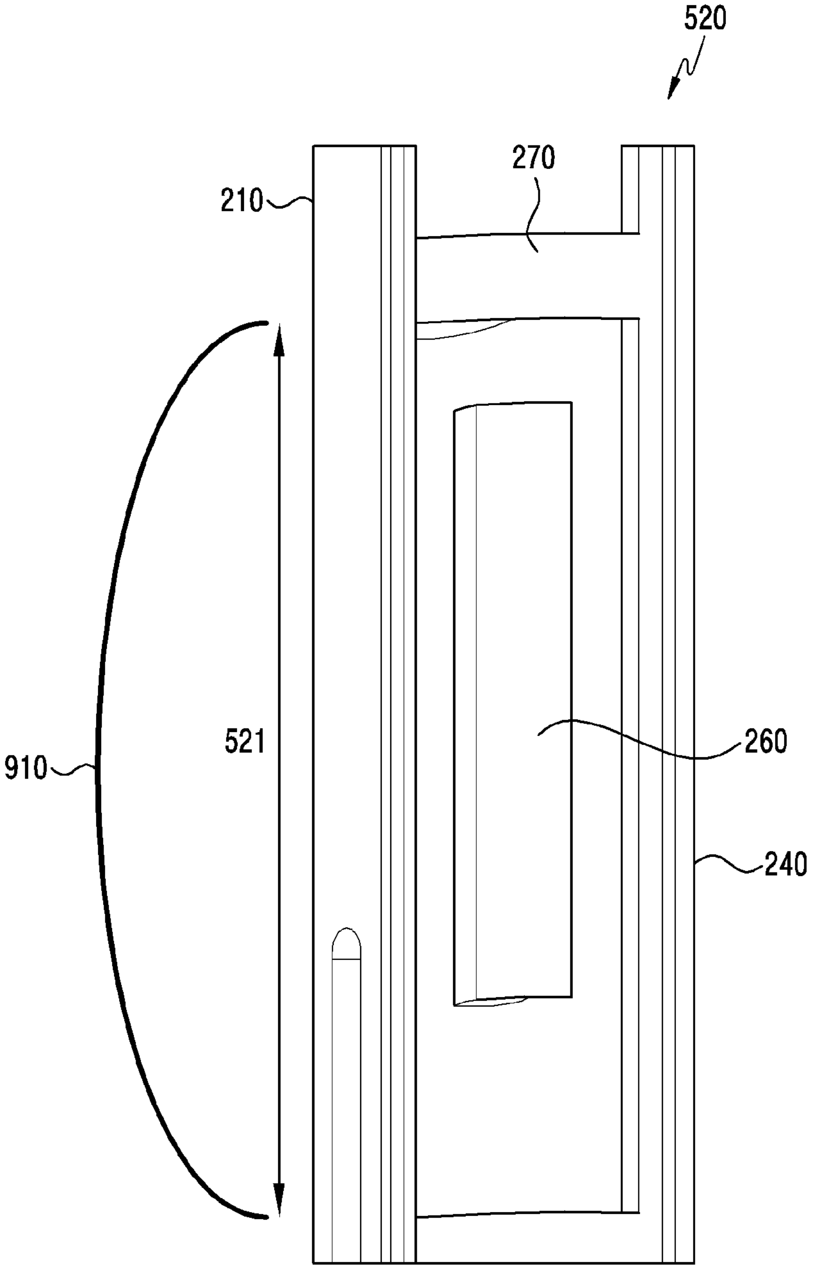
FIG. 9A illustrates a resonance formed in a second antenna according to an embodiment of the disclosure.
Figure 9B:
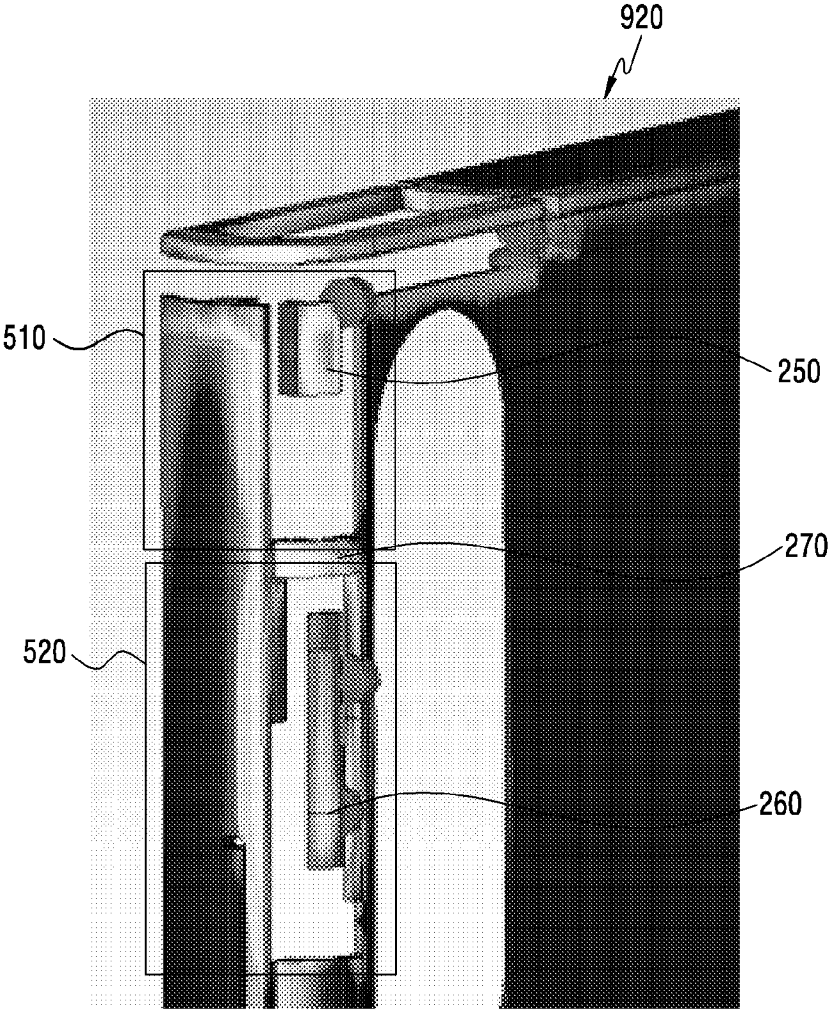
FIG. 9B illustrates an energy distribution formed in an electronic device when a third resonance occurs according to an embodiment of the disclosure.
Figure 9C:
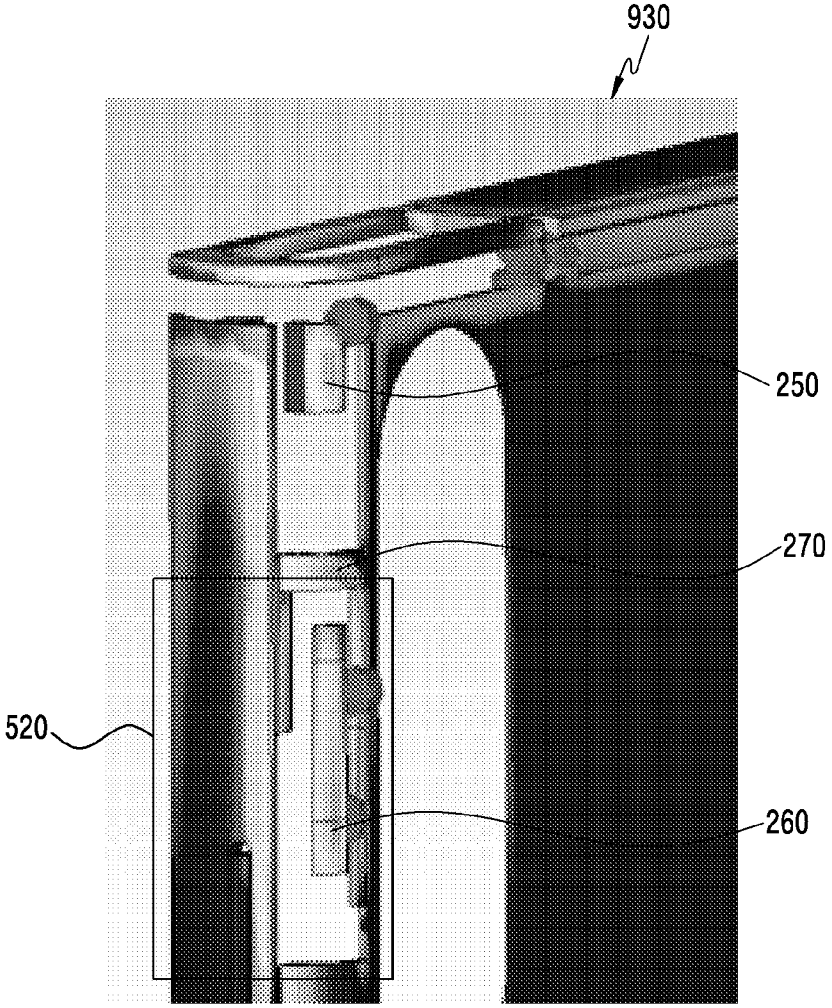
FIG. 9C illustrates an energy distribution formed in an electronic device when a fourth resonance occurs according to an embodiment of the disclosure.

FIG. 9A illustrates a resonance occurring in the second region according to an embodiment of the disclosure. FIG. 9B illustrates an energy distribution formed in the electronic device when the third resonance occurs according to an embodiment of the disclosure. FIG. 9C illustrates an energy distribution formed in the electronic device when the fourth resonance occurs according to an embodiment of the disclosure.

According to an embodiment, when the width of the first slot 512 in the first range 511 decreases, the resonance frequency band of the first resonance 610 may increase in a first range 810, and the resonance frequency band of the third resonance 630 may increase in a second range 820. In contrast, when the width of the first slot 512 in the second range 521 increases, the resonance frequency band of the first resonance 610 may decrease in the first range 810, and the resonance frequency band of the third resonance 630 may decrease in the second range 820.

Referring to FIGS. 9A, 9B, and 9C, when a resonance having a second voltage distribution 910 occurs in the second region 520 according to an embodiment, the third resonance 630 and the fourth resonance 640 may occur.

According to an embodiment, the second voltage distribution 910 may be formed by the second slot 522 and the conductive portion 270. In an example, the second voltage distribution 910 may have zero or a minimum value at one end of the second slot 522 that is in contact with the conductive portion 270. As an example, the second voltage distribution 910 may have zero or a minimum value at one end of the second slot 522 that is not in contact with the conductive portion 270.

According to an embodiment, the wireless communication circuit 280 may transmit and/or receive a radio signal in the resonance frequency band of the third resonance 630 or the resonance frequency band of the fourth resonance 640 by feeding power to the first conductive member 250 or the second conductive member 260. In an example, the second slot 522 may operate as a multi-band antenna having the resonance frequency band of the third resonance 630 and the resonance frequency band of the fourth resonance 640. For example, when the wireless communication circuit 280 feeds power to the first conductive member 250, the third resonance 630 having a resonance frequency of a frequency band of about 2.9 GHz may occur in the second region 520, and the wireless communication circuit 280 may transmit and/or receive a radio signal in a frequency band of about 2.9 GHZ. As another example, when the wireless communication circuit 280 feeds power to the second conductive member 260, the fourth resonance 640 having a resonance frequency of a frequency band of about 2.65 GHz may occur in the second region 520, and the wireless communication circuit 280 may transmit and/or receive a radio signal in a frequency band of about 2.65 GHz.

According to an embodiment, the wireless communication circuit 280 may transmit and/or receive a radio signal in the resonance frequency band of the second resonance 620 and the resonance frequency band of the fourth resonance 640 by being connected to the second conductive member 260.

According to an embodiment, when the third resonance 630 occurs in the second region 520, an energy distribution may be formed in the electronic device 100 in the same form as an energy distribution 920.

According to an embodiment, when the fourth resonance 640 occurs in the second region 520, an energy distribution may be formed in the electronic device 100 in the same form as an energy distribution 930.

Figure 10:
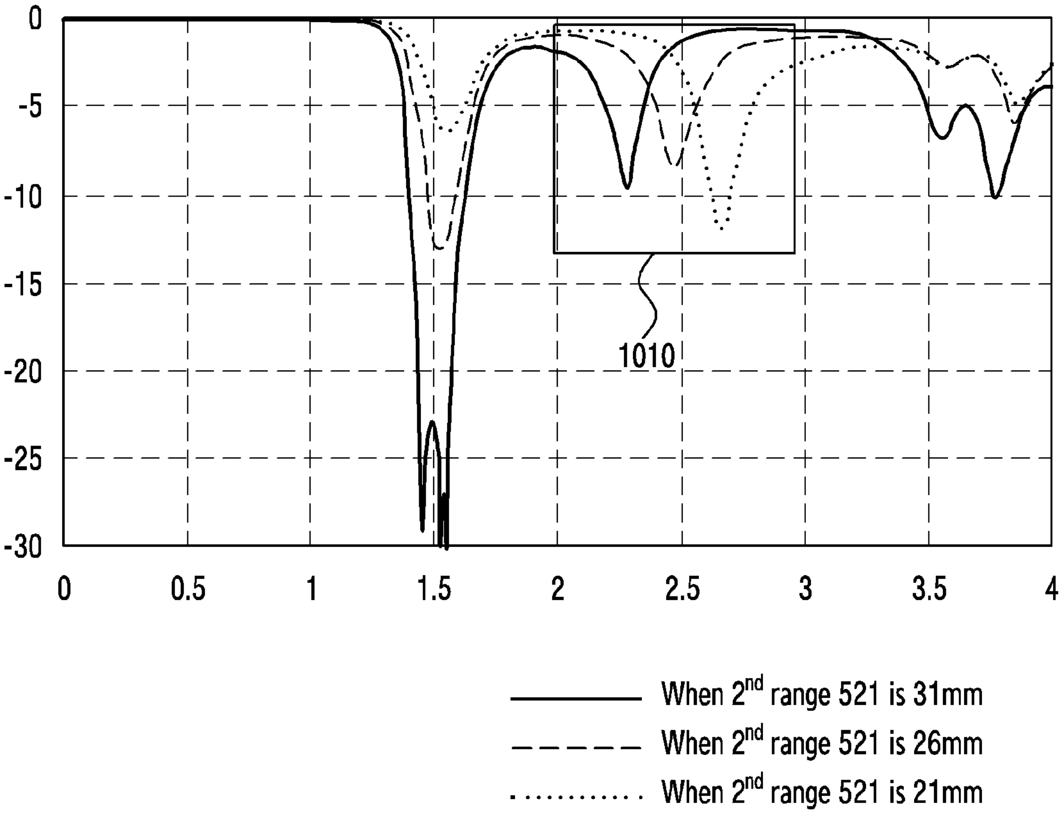
FIG. 10 is a graph illustrating a reflection coefficient according to a resonance formed in an electronic device according to a change of length in a second antenna according to an embodiment of the disclosure.

FIG. 10 is a graph illustrating reflection coefficients according to resonances occurring in an electronic device depending on a change of length in a second slot according to an embodiment of the disclosure. In an example, the resonance frequency band of the resonance occurring in the second region 520 may be adjusted by adjusting the length of the second slot 522.

Referring to FIG. 10, when a second slot 522 is provided in a second range 521 of different values, the resonances occurring the second region 520 may occur in different frequency bands.

According to an embodiment, when the second range 521 of the width of the second slot 522 is about 31 mm, the electronic device 100 may resonate in a frequency band of about 2 GHz to about 2.5 GHz.

According to an embodiment, when the second range 521 of the width of the second slot 522 is about 26 mm, the electronic device 100 may resonate in a frequency band of about 2.4 GHz to about 2.5 GHz.

According to an embodiment, when the second range 521 of the width of the second slot 522 is about 21 mm, the electronic device 100 may resonate in a frequency band of about 2.5 GHz to about 2.7 GHZ.

Based on the graph of FIG. 10 according to an embodiment, when the second range 521 of the value of the width of the second slot 522 decreases in the range of about 35 mm to about 15 mm, the resonance frequency band may increase. In an example, when the length of the second slot 522 increases, the resonance frequency of the resonance occurring in the second region 520 (e.g., the resonance frequency of the fourth resonance 640 in FIG. 6) is shifted to a lower frequency band, and when the length of the second slot 522 decreases, the resonance frequency of the resonance occurring in the second region 520 (e.g., the resonance frequency of the fourth resonance 640 in FIG. 6) may be shifted to a higher frequency band.

According to an embodiment, when the width of the second slot 522 in the second range 521 increases, the resonance frequency of the fourth resonance 640 in a first region 1010 may decrease, and when the width of the second slot 522 in the second range 521 decreases, the resonance frequency of the fourth resonance 640 in the first region 1010 may increase.

According to an embodiment, even when the width of the second slot 522 in the second range 521 is changed, the resonance frequency of the second resonance 620 may not substantially change when the width of the first slot 512 in the first range 511 does not change. In an example, even when the length of the second slot 522 is changed, when the length of the first slot 512 is fixed, only the reflection coefficient or bandwidth of the second resonance 620 may change, and the resonance frequency may not be affected.

Figure 11A:
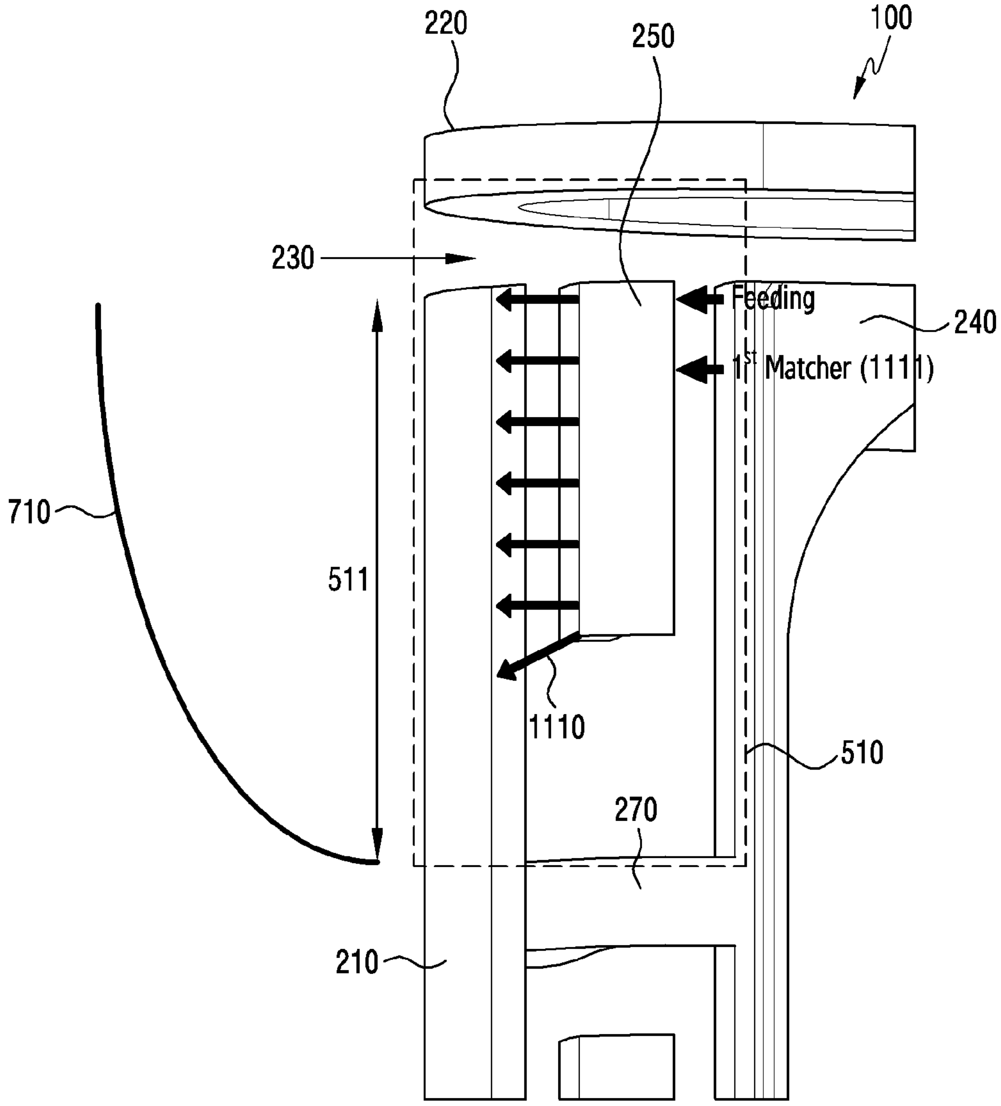
FIG. 11A illustrates first coupling feeding occurring in an electronic device when power is fed to a first conductive member according to an embodiment of the disclosure.

FIG. 11A illustrates first coupling feeding occurring in the electronic device when power is fed to the first conductive member according to an embodiment of the disclosure.

Referring to FIG. 11A, when power is fed to a first conductive member 250, first coupling feeding 1110 may occur in a first region 510. In an example, since the description made above with reference to FIG. 7A is applicable to the first conductive frame 210, the second conductive frame 220, the split portion 230, the conductive structure 240, the first conductive member 250, and the conductive portion 270 illustrated in FIG. 11A, an additional description will be omitted.

According to an embodiment, when the wireless communication circuit 280 feeds power to the first conductive member 250, first coupling feeding 1110 directed from the first conductive member 250 to the first conductive frame 210 may occur. In an example, a flow of current may be formed in the first conductive member 250 fed with power from the wireless communication circuit 280, and the flow of current formed in the first conductive member 250 may induce current in the first conductive frame 210, thereby implementing feeding through coupling.

According to an embodiment, a resonance having the first voltage distribution 710 may occur in the first portion 210-1 of the first conductive frame 210 by the first coupling feeding 1110.

According to an embodiment, a first matcher 1111 may be connected to the first conductive member 250.

According to an embodiment, the first matcher 1111 may be disposed on a path connecting a ground region (or a ground portion) and a feeding portion to each other. In an example, the first matcher 1111 may be provided as at least a part of the ground portion.

Figure 11B:
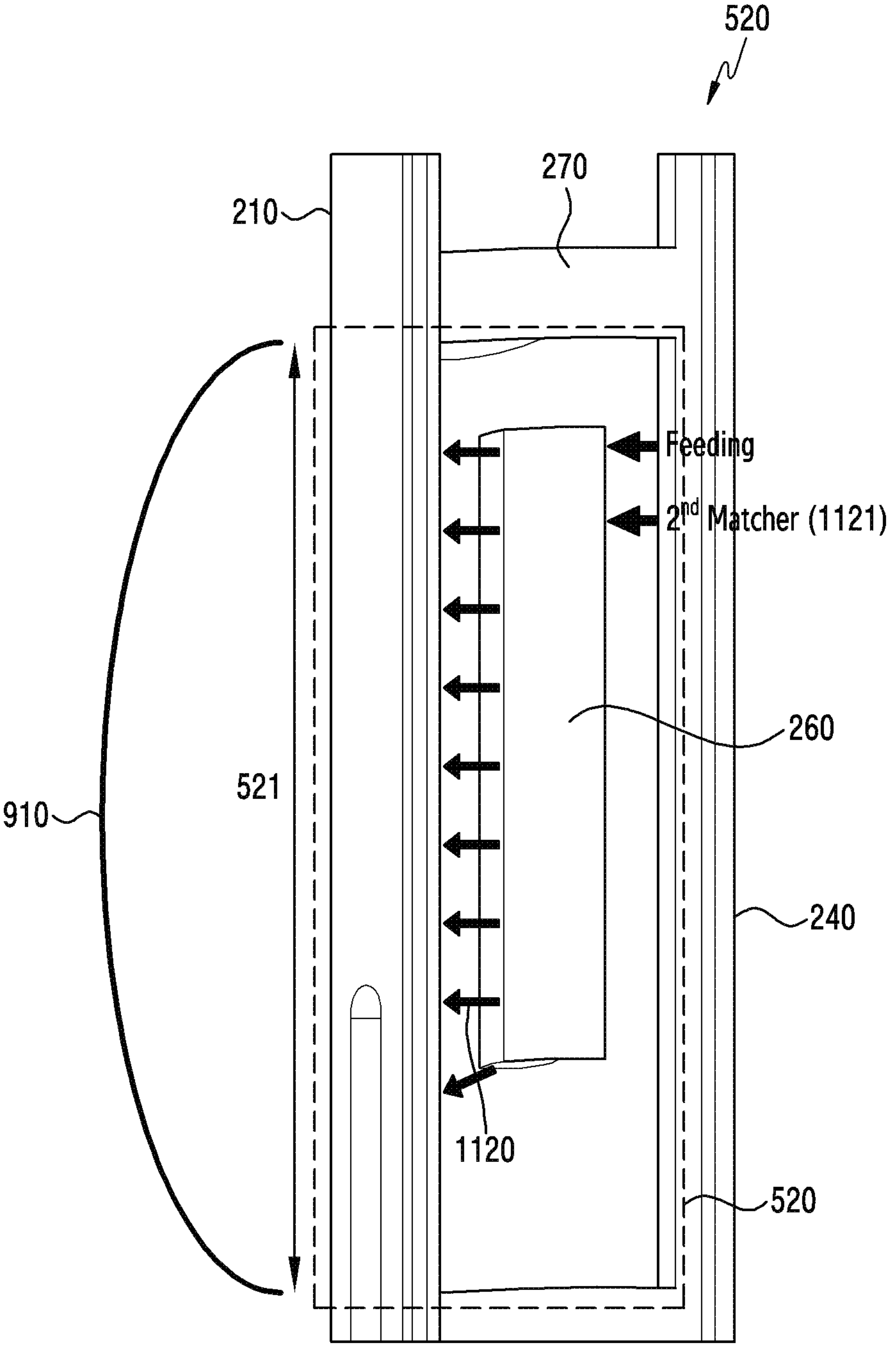
FIG. 11B illustrates coupling feeding occurring in an electronic device when power is fed to a second conductive member according to an embodiment of the disclosure.

FIG. 11B illustrates coupling feeding occurring in the electronic device when power is fed to the second conductive member according to an embodiment of the disclosure.

Referring to FIG. 11B, when power is fed to a second conductive member 260, coupling feeding may occur in a second region 520. In an example, since the description made above with reference to FIGS. 9A to 9C is applicable to the first conductive frame 210, the conductive structure 240, the second conductive member 260, and the conductive portion 270 illustrated in FIG. 11B, an additional description will be omitted.

According to an embodiment, when the wireless communication circuit 280 feeds power to the second conductive member 260, second coupling feeding 1120 directed from the second conductive member 260 to at least a portion of the first conductive frame 210, the conductive structure 240, or the conductive portion 270 may occur. In an example, the flow of current formed in the second conductive member 260 fed with power from the wireless communication circuit 280 may induce current in at least a portion of the first conductive frame 210, the conductive structure 240, or the conductive portion 270, and the electronic device may implement feeding through coupling by using the induced current.

According to an embodiment, a resonance having the second voltage distribution 910 may occur in the second portion 210-2 of the first conductive frame 210 by the second coupling feeding 1120.

According to an embodiment, a second matcher 1121 may be connected to the second conductive member 260.

Figure 11C:
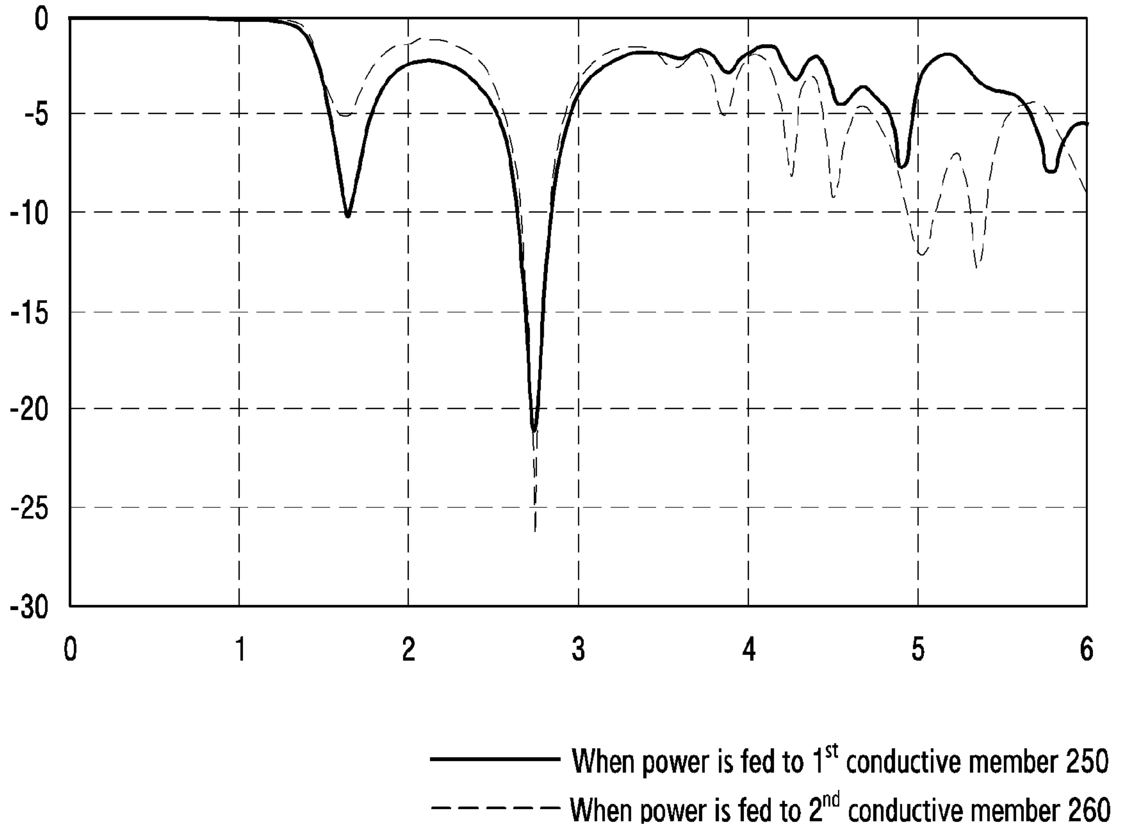
FIG. 11C is a graph illustrating reflection coefficients according to resonances generated by a first antenna or a second antenna according to an embodiment of the disclosure.

FIG. 11C is a graph illustrating reflection coefficients according to resonances generated by a first slot or a second slot according to an embodiment of the disclosure.

Referring to FIG. 11C, a resonance frequency band may be changed by adjusting the matching in a first slot 512 or a second slot 522 by using a first matcher 1111 or a second matcher 1121.

According to an embodiment, the first matcher 1111 may adjust the resonance frequency formed by the first coupling feeding 1110. For example, when the resonance frequency of the first slot 512 is about 1.6 GHz and the natural resonance frequency of the second slot 522 is about 2.7 GHZ, it is possible to form a resonance in a frequency band of about 2.7 GHz by adjusting the matching in the first slot 512 through the first matcher 1111.

According to an embodiment, the third resonance frequency band may be changed by adjusting the matching in the first slot 512 by using the first matcher 1111.

In an example, the second matcher 1121 may adjust the resonance frequency formed by the second coupling feeding 1120. For example, when the first resonance frequency of the first slot 512 is about 1.6 GHz and the fourth resonance frequency of the second slot 522 is about 2.7 GHZ, it is possible to form a resonance in a frequency band of about 1.6 GHz by adjusting the matching in the second slot 522 through the second matcher 1121.

According to an embodiment, the second resonance frequency band may be changed by adjusting the matching in the second slot 522 by using the second matcher 1121.

Figure 12A:
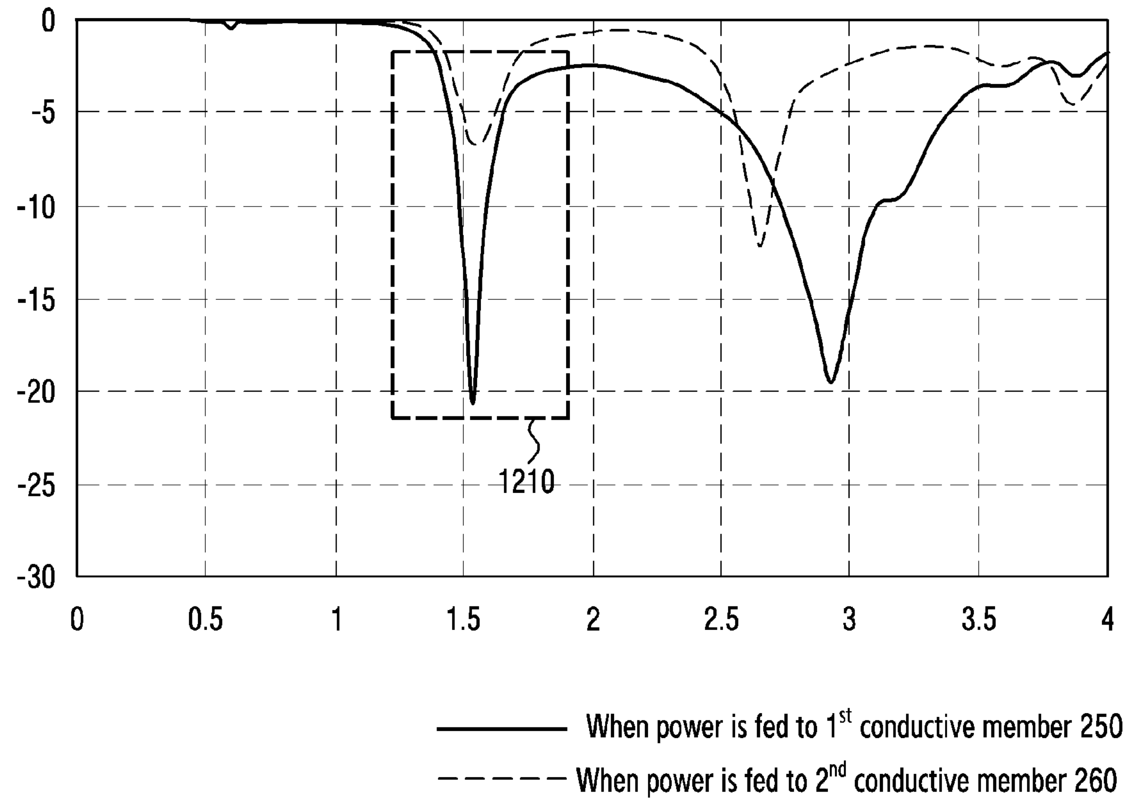
FIG. 12A is a graph of reflection coefficients when resonances generated by a first slot occur in the same frequency in a first region and a second region according to an embodiment of the disclosure.

FIG. 12A is a graph of reflection coefficients when resonances occur in the same frequency band by a first slot when power is fed to each of a first conductive member and a second conductive member according to an embodiment of the disclosure. In an example, it may be understood that FIG. 12A corresponds to a case in which, since no ground is provided on the first conductive member 250, the first conductive member 250 is fed with power in the form of a monopole and since a ground is provided on the second conductive member 260, the second conductive member 260 is fed with power in the form of an inverted-F antenna (IFA). For example, a capacitor having a capacitance value of about 100 picofarad (pF) may be disposed on a first feeding path for feeding power to the first conductive member 250. As another example, a capacitor having a capacitance value of about 1 pF is disposed on a second feeding path for feeding power to the second conductive member 260, and an inductor having an inductance value of about 1.2 nanohenry (nH) may be disposed on the second feeding path for matching.

Figure 12B:
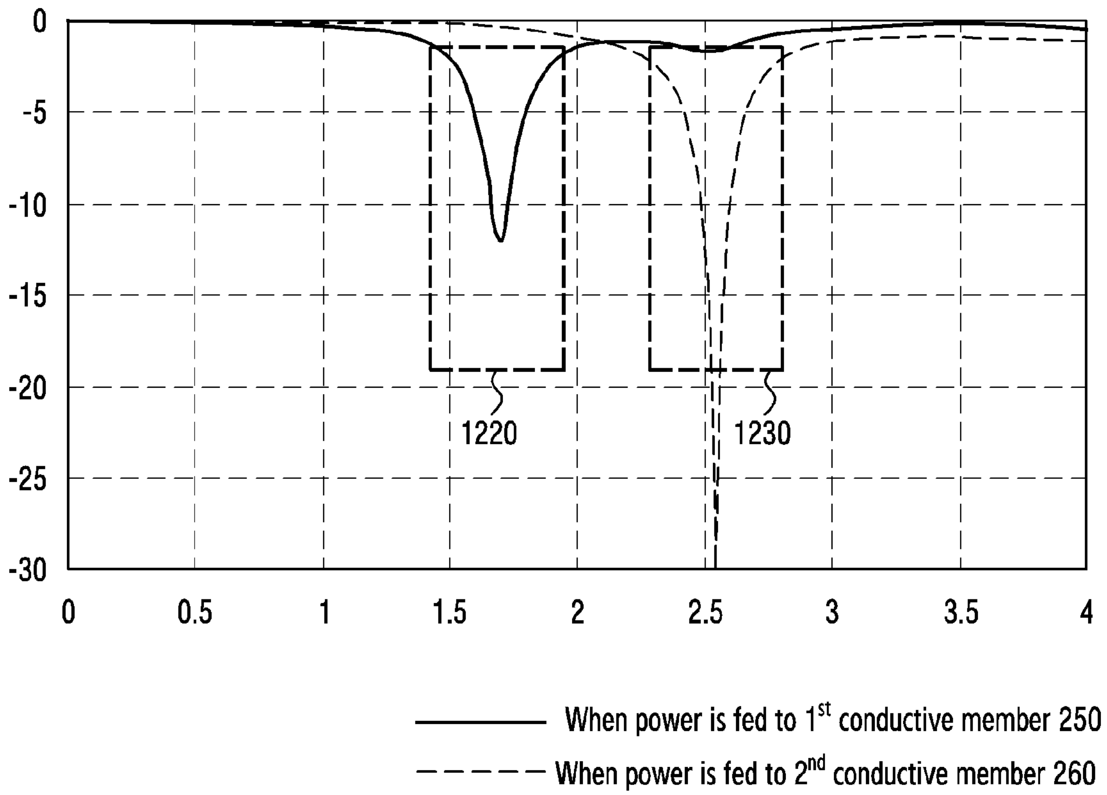
FIG. 12B is a graph of reflection coefficients when resonances generated by a first slot and a second slot occur independently according to an embodiment of the disclosure.

FIG. 12B is a graph of reflection coefficients when resonances generated by a first slot and a second slot occur independently according to an embodiment of the disclosure. In an example, it may be understood that FIG. 12B corresponds to a case in which grounds are provided on the first conductive member 250 and the second conductive member 260, respective, so that the first conductive member 250 and the second conductive member 260 are fed with power in the form of an IFA. For example, a capacitor having a capacitance value of about 100 pF may be disposed on the first feeding path for feeding power to the first conductive member 250, and a capacitor having a capacitance value of about 1 pF and an inductor having an inductance value of about 12 nH may be disposed on the first feeding path for impedance matching. As another example, a capacitor having a capacitance value of about 1 pF may be disposed on the second feeding path for feeding power to the second conductive member 260, and a capacitor having a capacitance value of about 100 pF and an inductor having an inductance value of about 12 nH may be disposed on the second feeding path for impedance matching.

Figure 12C:
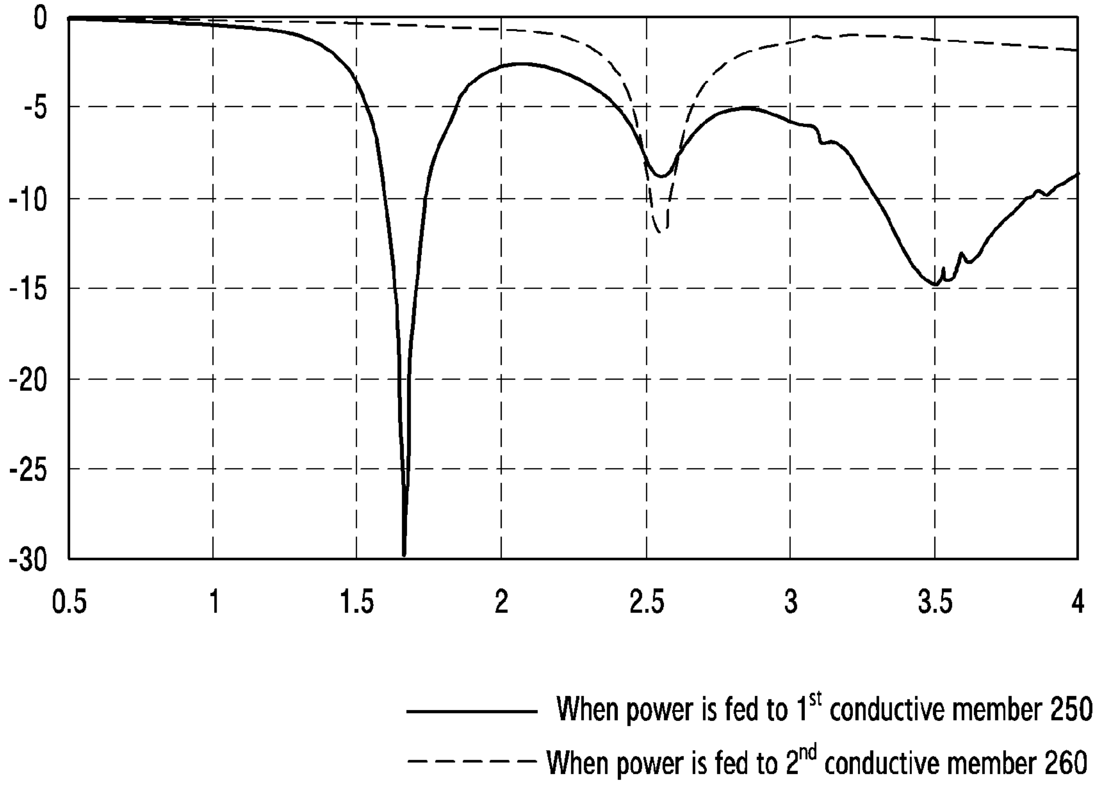
FIG. 12C is a graph of reflection coefficients when resonances generated by a second slot occur in the same frequency in a first region and a second region according to an embodiment of the disclosure.

FIG. 12C is a graph of reflection coefficients when resonances occur in the same frequency band by a second slot when power is fed to each of a first conductive member and a second conductive member according to an embodiment of the disclosure. In an example, it may be understood that FIG. 12C corresponds to a case in which no ground is provided on each of the first conductive member 250 and the second conductive member 260, respective, so that the first conductive member 250 and the second conductive member 260 are fed with power in the form of monopole. For example, a capacitor having a capacitance value of about 100 pF may be disposed on a first feeding path for feeding power to the first conductive member 250. As another example, a capacitor having a capacitance value of about 100 pF may be disposed on a second feeding path for feeding power to the second conductive member 260.

Referring to FIGS. 12A, 12B, and 12C, when a reflection coefficient graph has a minimum value, it may be understood that the antenna radiation efficiency is maximized and the minimum value corresponds to a point at which a resonance occurs.

According to an embodiment, when power is fed to the first conductive member 250 and the second conductive member 260, it is possible to form resonances in the same frequency band of about 1.5 GHz as in a first region 1210 by adjusting power fed to the first slot 512 and the second slot 522. According to an embodiment, as illustrated in FIG. 12A, since the first conductive member 250 is fed with power in the form of a monopole, and the second conductive member 260 is fed with in the form of an inverted-F antenna (IFA), even when resonances occur in the same or similar frequency bands, the first and second conductive members may operate as different antenna radiators due to different feeding structures. Accordingly, the first resonance formed by feeding the first conductive member 250 and the second resonance formed by feeding the second conductive member 260 may have excellent isolation characteristics.

According to an embodiment, when power is fed to the first conductive member 250 and the second conductive member 260, resonances in different frequency bands of about 1.5 GHz may occur as in a second region 1220 and a third region 1230 by adjusting the power fed to the first slot 512 and the second slot 522. In an example, the resonances generated by the first slot 512 and the second slot 522 may have an excellent isolation characteristic without causing mutual interference. According to an embodiment, when power is fed to the first conductive member 250 and the second conductive member 260, resonances may occur in the same frequency band of about 2.5 GHz as in FIG. 12C by adjusting the power fed to the first slot 512 and the second slot 522.

Figure 13A:
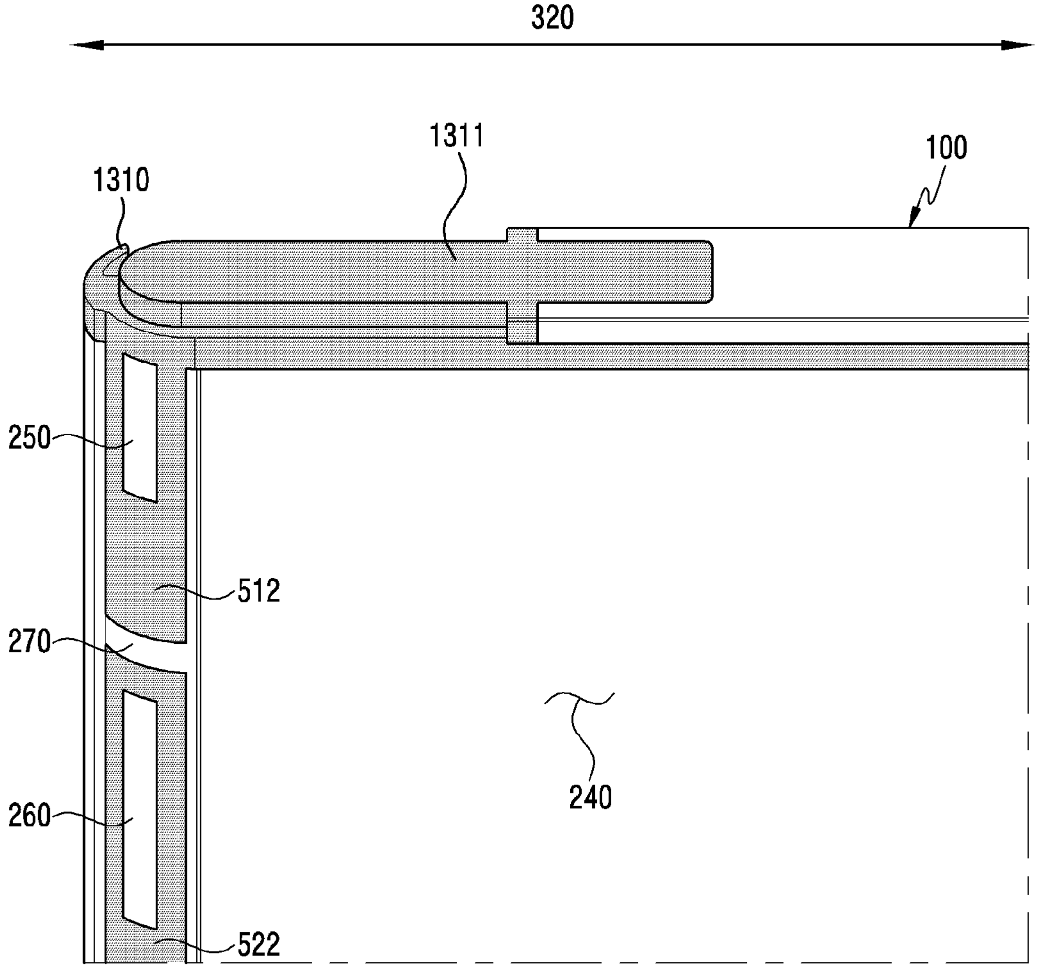
FIG. 13A illustrates an electronic device including a second conductive frame according to an embodiment of the disclosure.
Figure 13B:
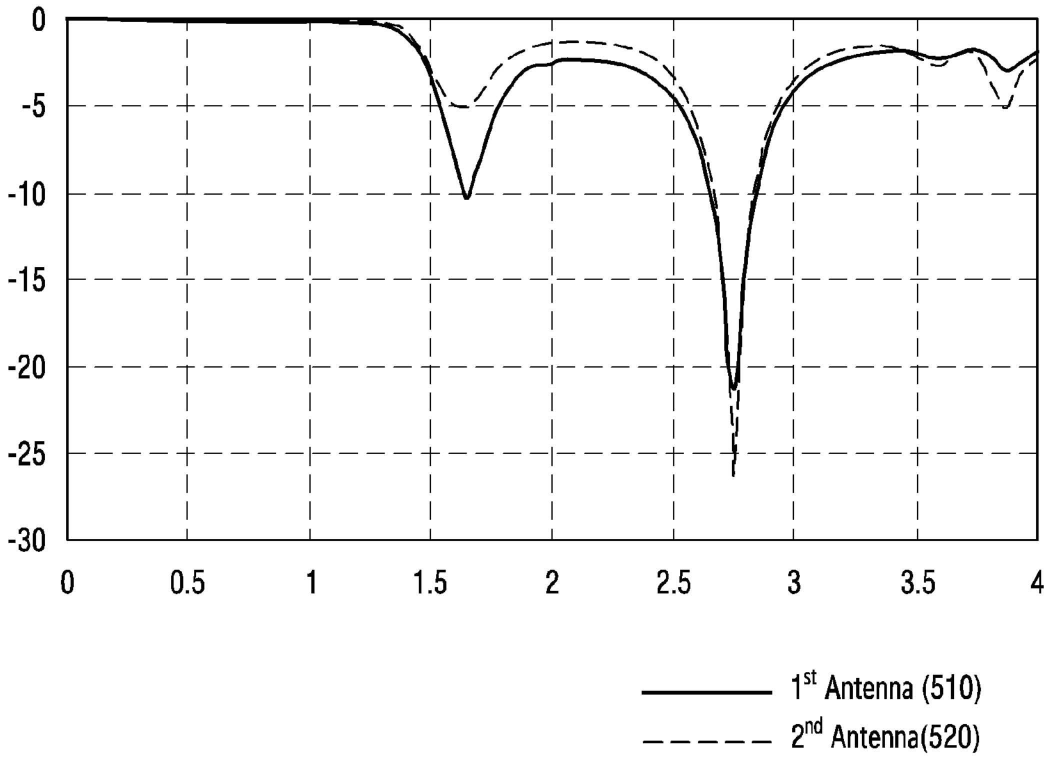
FIG. 13B is a graph of reflection coefficients of resonances generated by the first antenna and the second antenna of FIG. 13A according to an embodiment of the disclosure.

FIG. 13A illustrates an electronic device including a second frame according to an embodiment of the disclosure. FIG. 13B is a graph of reflection coefficients of resonances generated by the first slot and the second slot of FIG. 13A according to an embodiment of the disclosure.

Referring to FIGS. 13A and 13B, an electronic device 100 including a second frame 1310 according to an embodiment may have radiation characteristics as illustrated in the graph of FIG. 13B.

According to an embodiment, the electronic device 100 may include a second frame 1310 formed of a non-conductive material, and the second frame 1310 may include a non-conductive portion 1311.

Comparing the embodiment of FIG. 13A with the embodiment illustrated in FIG. 3, the embodiment of FIG. 13A may be an embodiment in which the second conductive frame (e.g., the second conductive frame 220 in FIG. 3) is removed from the embodiment of FIG. 3. As a result, in the embodiment of FIG. 13A, the second frame 1310 formed of a non-conductive material instead of the second conductive frame 220 may configure a portion of the second edge 320 of the electronic device 100.

According to an embodiment, when the second frame 1310 is provided in the electronic device 100 (or when the second conductive frame 220 illustrated in FIG. 3 is removed), the first conductive member 250 may not be affected by the second frame 1310. For example, when the non-conductive portion 1311 formed of a non-conductive material is provided in a portion adjacent to the first conductive member 250 of the second edge 320 of the electronic device 100, the first conductive member 250 may not be greatly electromagnetically affected by the second frame 1310.

According to an embodiment, when the second frame 1310 is not formed in the electronic device 100, the first slot 512 may resonate in a frequency band of about 1.5 GHz to about 1.7 GHZ. In an example, when power is fed to the first conductive member 250, a first resonance may occur in the first slot 512 in a frequency band of about 1.6 GHZ. In another example, when power is fed to the second conductive member 260, a second resonance may occur in the first slot 512 in a frequency band of about 1.6 GHz.

According to an embodiment, when the second frame 1310 is not formed in the electronic device 100, the second slot 522 may resonate in a frequency band of about 2.5 GHz to about 3 GHz. In an example, when power is fed to the first conductive member 250, a third resonance may occur in the second slot 522 in a frequency band of about 2.8 GHz. In another example, when power is fed to the second conductive member 260, a fourth resonance may occur in the second slot 522 in a frequency band of about 2.8 GHz.

Figure 14A:
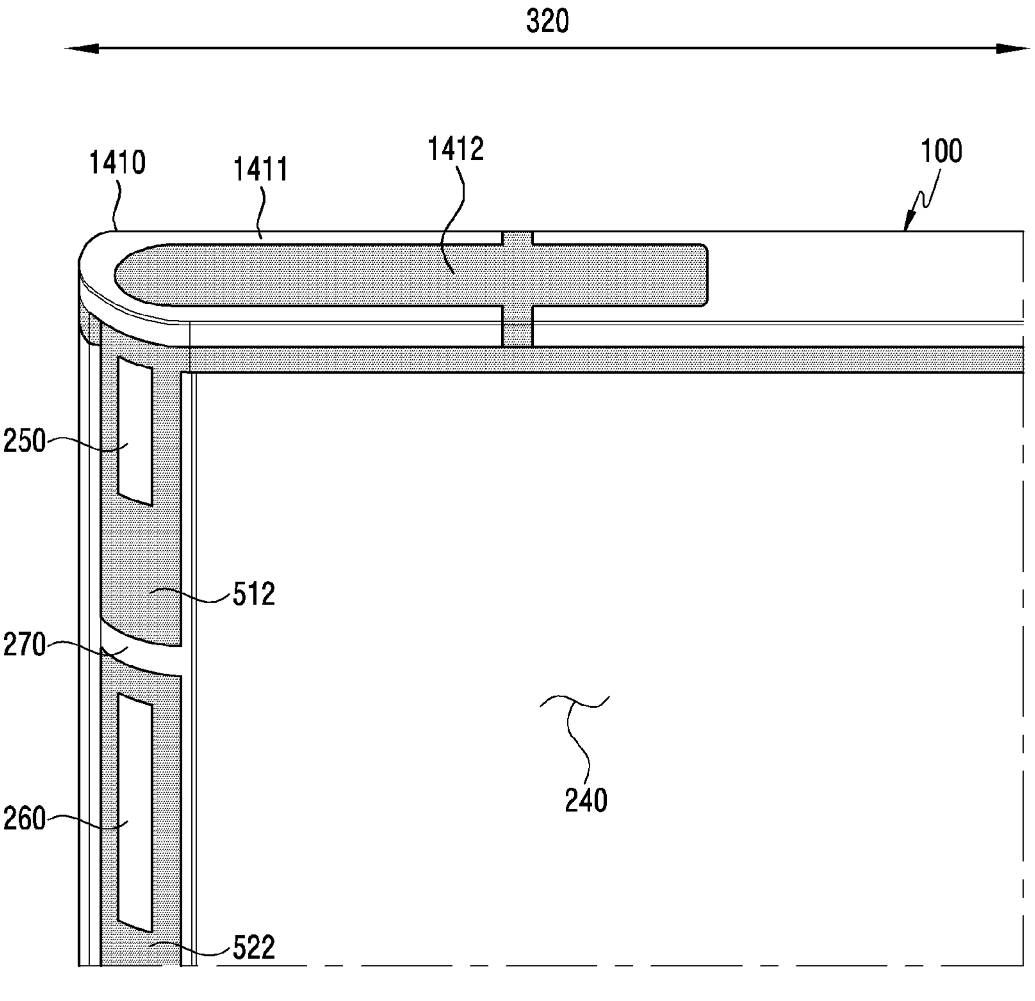
FIG. 14A illustrates an electronic device including a second conductive frame according to an embodiment of the disclosure.
Figure 14B:
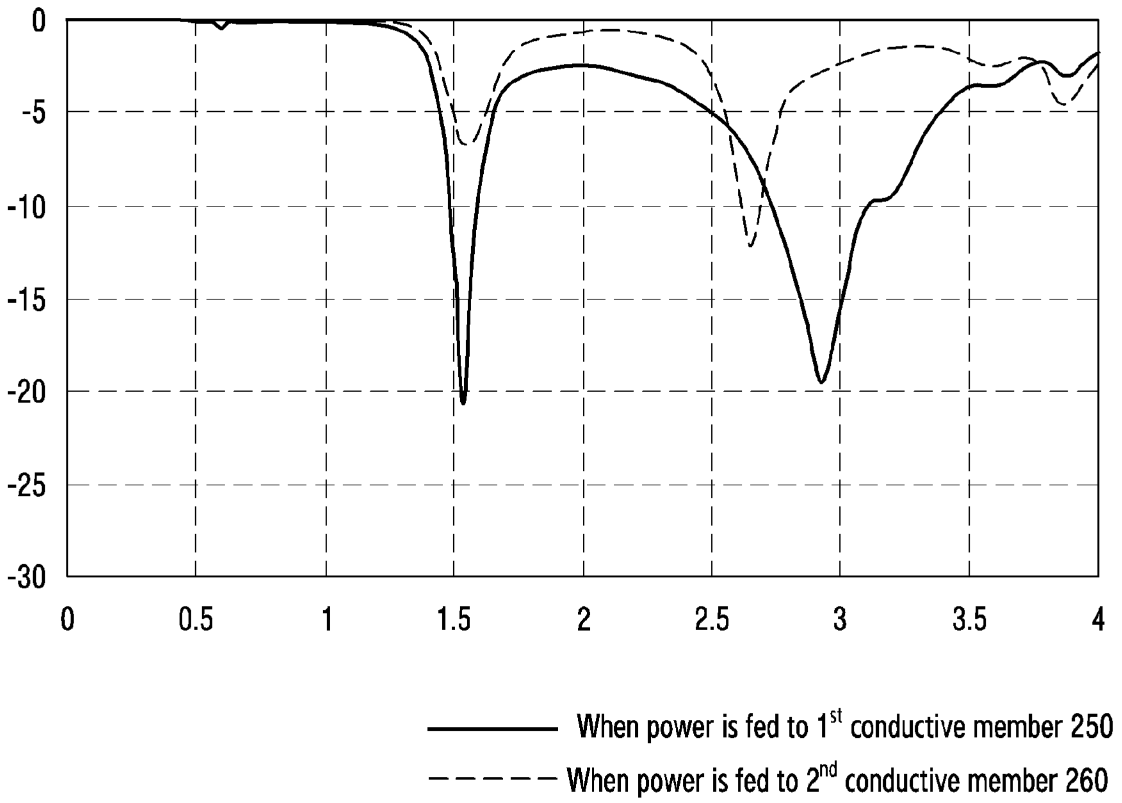
FIG. 14B is a graph of reflection coefficients of resonances generated by the first antenna and the second antenna of FIG. 14A according to an embodiment of the disclosure.

FIG. 14A illustrates an electronic device including a second conductive frame according to an embodiment of the disclosure. FIG. 14B is a graph of reflection coefficients of resonances generated by the first slot and the second slot of FIG. 14A according to an embodiment of the disclosure. In an example, the second conductive frame 1410 illustrated in FIG. 14A may be understood as an example of the second conductive frame 220.

Referring to FIGS. 14A and 14B, an electronic device 100 including a second conductive frame 1410 may have radiation characteristics as illustrated in the graph of FIG. 14B.

According to an embodiment, the second conductive frame 1410 (e.g., the second conductive frame 220 in FIG. 3) may include a conductive portion 1411 and a non-conductive portion 1412. The conductive portion 1411 may be provided in a U-shape at an edge of the second conductive frame 1410. In an example, when the second conductive frame 1410 is provided in the electronic device 100, the first conductive member 250 may be affected by the conductive portion 1411 included in the second conductive frame 1410. For example, when the conductive portion 1411 is provided in a portion of the second conductive frame 1410 of the electronic device 100, the first conductive member 250 may be electromagnetically affected by the conductive portion 1411 provided in the second frame 1310.

According to an embodiment, when the second conductive frame 1410 is provided in the electronic device 100, the first slot 512 may resonate in a frequency band lower than a frequency band of about 1.6 GHz by the capacitance component of the conductive portion 1411 included in the second conductive frame 1410. In an example, when power is fed to the first conductive member 250, a first resonance may occur in the first slot 512 in a frequency band of about 1.5 GHZ. In another example, when power is fed to the second conductive member 260, a second resonance may occur in the first slot 512 in a frequency band of about 1.5 GHz.

According to an embodiment, when the second conductive frame 1410 is provided in the electronic device 100, the second slot 522 may resonate in a frequency band different from a frequency band of about 2.8 GHz by the capacitance component of the conductive portion 1411 included in the second conductive frame 1410. In an example, when power is fed to the first conductive member 250, a third resonance may occur in the second slot 522 in a frequency band of about 2.9 GHZ. In another example, when power is fed to the second conductive member 260, a fourth resonance may occur in the second slot 522 in a frequency band of about 2.6 GHz. The fourth resonance may be affected by the split portion 230 adjacent to the conductive portion 1411 in addition to the second slot 522. As a result, the fourth resonance may be more affected by the conductive portion 1411 than the third resonance and may occur in a lower frequency band.

According to an embodiment, upon comparing FIGS. 13B and 14B, when the conductive portion 1411 is provided in the electronic device 100, the resonance frequency of the first slot 512 may be lowered compared to that in the case in which the conductive portion 1411 is not provided in the electronic device 100. In an example, the resonance frequency of the first slot 512 may be shifted and lowered by the capacitance value of the conductive portion 1411 included in the second conductive frame 1410.

Figure 15A:
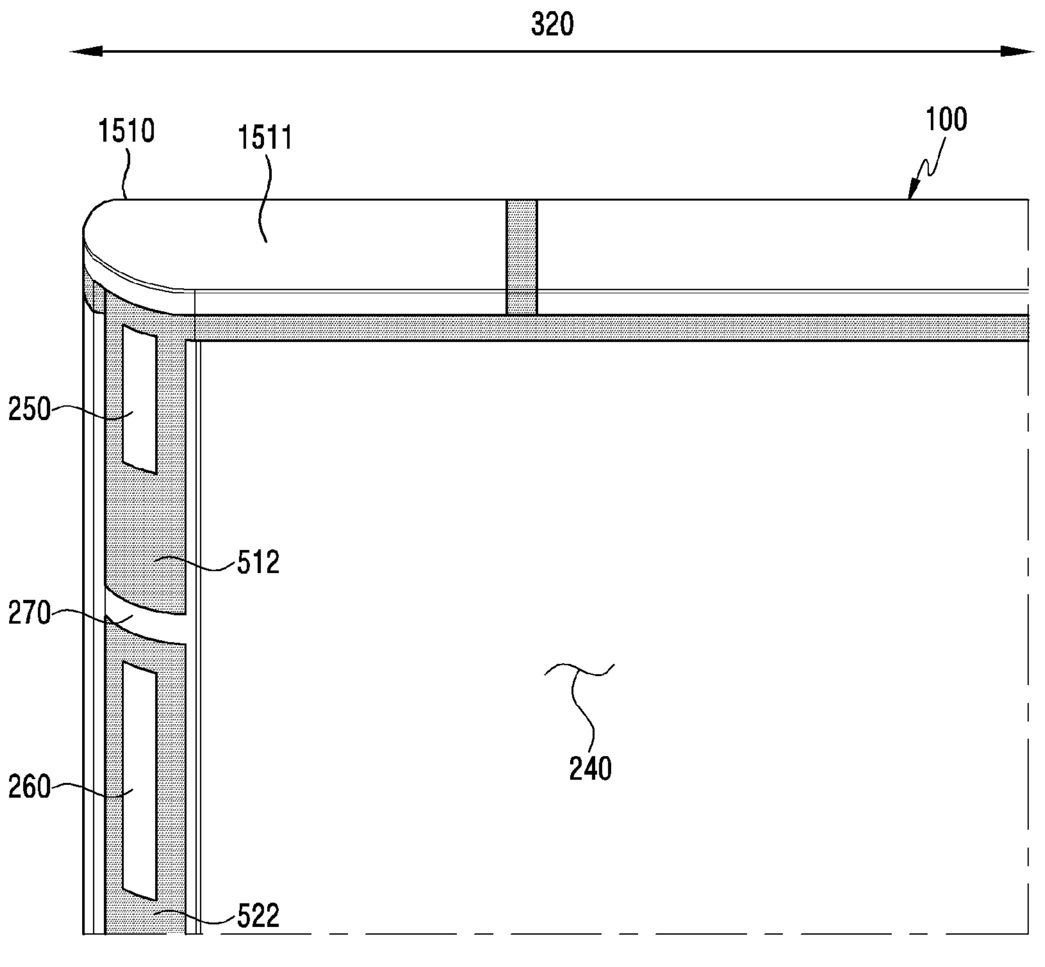
FIG. 15A illustrates an electronic device including a second conductive frame according to an embodiment of the disclosure.
Figure 15B:
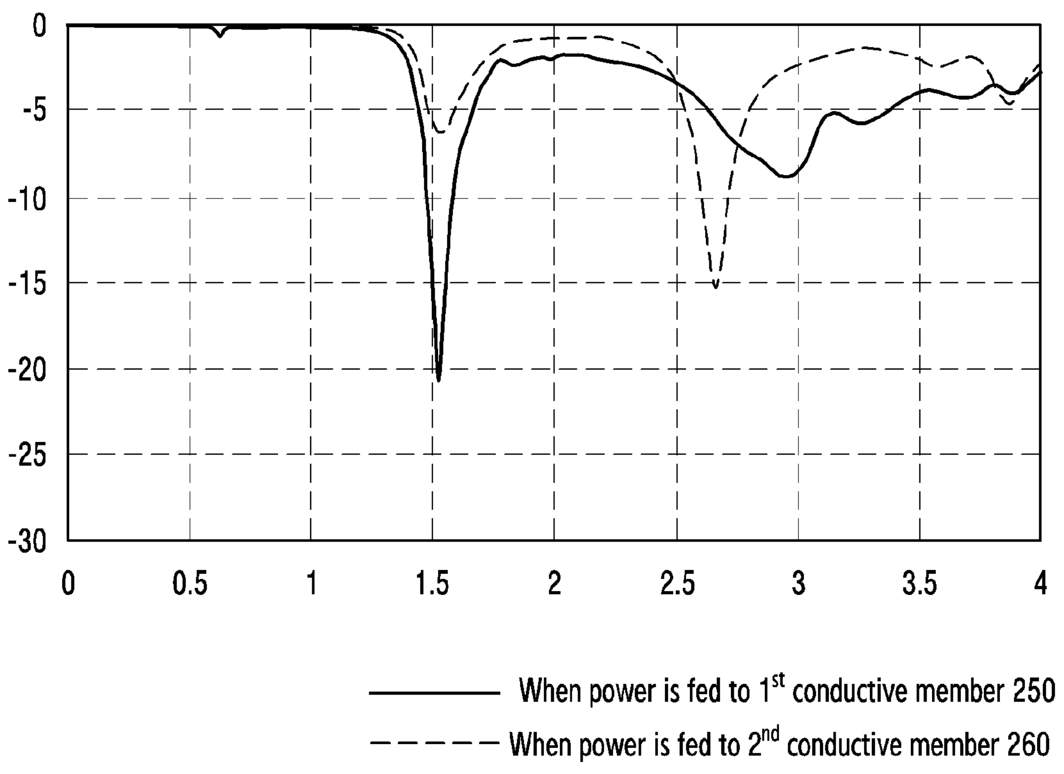
FIG. 15B is a graph of reflection coefficients of resonances generated by the first antenna and the second antenna of FIG. 15A according to an embodiment of the disclosure.

FIG. 15A illustrates an electronic device including a second conductive frame according to an embodiment of the disclosure. FIG. 15B is a graph of reflection coefficients of resonances generated by the first slot and the second slot of FIG. 15A according to an embodiment of the disclosure. In an example, the second conductive frame 1510 illustrated in FIG. 15A may be understood as an example of the second conductive frame 220.

Referring to FIGS. 15A and 15B, an electronic device 100 including a second conductive frame 1510 may have radiation characteristics as illustrated in the graph of FIG. 15B.

According to an embodiment, the second conductive frame 1510 may include a conductive portion 1511. For example, the second conductive frame 1510 may have a structure in which a non-conductive portion (e.g., the non-conductive portion 1412 in FIG. 14A) is omitted. The conductive portion 1511 may have a larger area than the conductive portion 1411, and thus may have a larger capacitance value. In an example, when the second conductive frame 1510 is provided in the electronic device 100, the first conductive member 250 may be affected by the conductive portion 1511 included in the second conductive frame 1510. For example, when the non-conductive portion is not provided in a portion of the second conductive frame 220 of the electronic device 100, since most of the portion of the second edge 320 of the electronic device 100 adjacent to the first conductive member 250 may be filled with the conductive portion 1511 formed of a conductive material, the first conductive member 250 may be greatly electromagnetically affected by the conductive portion 1511.

According to an embodiment, when the second conductive frame 1510 is provided in the electronic device 100, the first slot 512 may resonate in a frequency band lower than a frequency band of about 1.6 GHz. In an example, when power is fed to the first conductive member 250, a first resonance may occur in the first slot 512 in a frequency band of about 1.5 GHz. In another example, when power is fed to the second conductive member 260, a second resonance may be formed in the first slot 512 in a frequency band of about 1.5 GHz.

According to an embodiment, when the second conductive frame 1510 is formed in the electronic device 100, the second slot 522 is formed by a capacitance component of the conductive portion 1511 included in the second conductive frame 1510 and may resonate in a frequency band different from a frequency band of about 2.8 GHz. In an example, when power is fed to the first conductive member 250, a third resonance may be formed in the second slot 522 in a frequency band of about 3 GHz. In another example, when power is fed to the second conductive member 260, a fourth resonance may be formed in the second slot 522 in a frequency band of about 2.6 GHz. The fourth resonance may be affected by the split portion 230 adjacent to the conductive portion 1511 in addition to the second slot 522. As a result, the fourth resonance may be more affected by the conductive portion 1511 than the third resonance and may occur in a lower frequency band.

According to an embodiment, upon comparing FIGS. 14B and 15B, when the second conductive frame 1510 is provided in the electronic device 100, a resonance may occur in a frequency band which is the same as or close to that in the case in which the second conductive frame 1410 is provided in the electronic device 100. In an example, the resonance occurring in the first slot 512 may only be affected by the presence or absence of a conductive portion irrespective of the area of the conductive portion 1411 included in the second conductive frame 1410 and the area of the conductive portion 1511 included in the second conductive frame 1510.

Figure 16A:
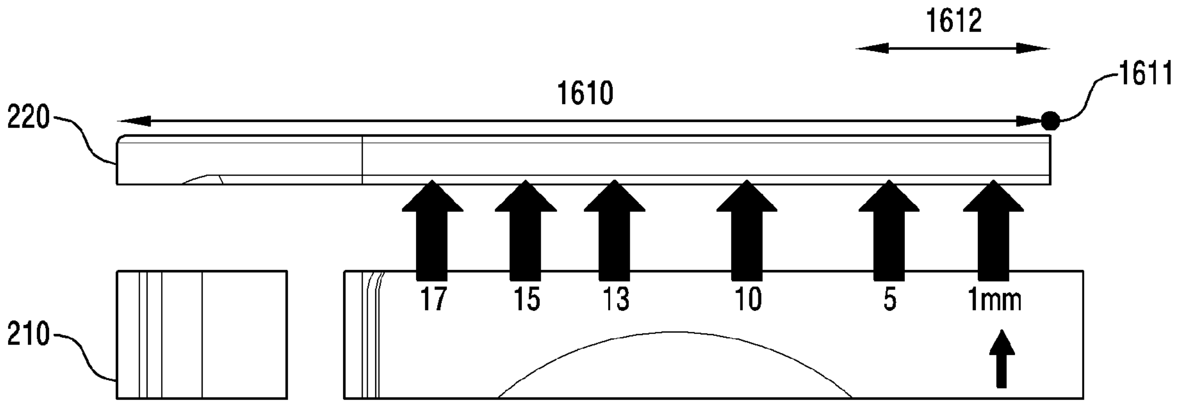
FIG. 16A illustrates a ground point provided at a position of a second conductive frame according to an embodiment of the disclosure.

FIG. 16A illustrates a ground point provided at a position of a second conductive frame according to an embodiment of the disclosure.

Referring to FIG. 16A, a ground point electrically connected to a ground region may be provided at one position of a second conductive frame 220.

According to an embodiment, the second conductive frame 220 may have a length of a first width 1610. In an example, the first width 1610 may be about 24 mm.

According to an embodiment, the ground point formed at a position of the second conductive frame 220 may be located at a point spaced apart from a first point 1611 by a first distance 1612. In an example, the first distance 1612 may include one of about 1 mm, about 5 mm, about 10 mm, about 13 mm, about 15 mm, or about 17 mm, wherein these numerical values are arbitrary ones and may be changed in some cases.

According to an embodiment, when power is fed to the second conductive frame 220 at a point where the first distance 1612 is about 24 mm, and the ground point is changed while changing the first distance 1612 from about 1 mm to about 17 mm, the resonance occurring in the first slot 512 may be affected by the change in the electrical length of the second conductive frame 220. The aspect in which the resonance of the first slot 512 changes according to the change of a ground point is illustrated in FIG. 16B, and the aspect in which the resonance of the second slot 522 changes according to the change of a ground point is illustrated in FIG. 16C.

Figure 16B:
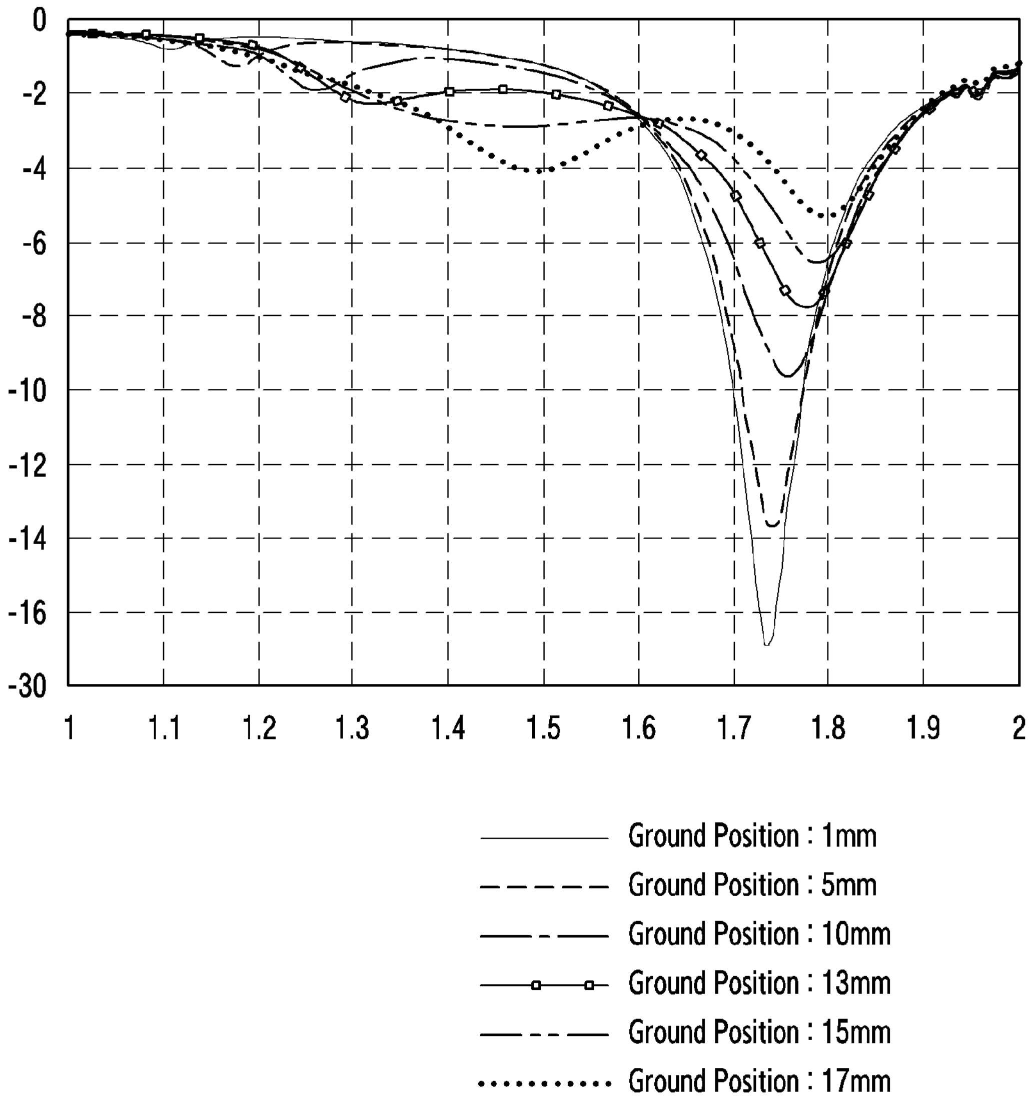
FIG. 16B is a graph illustrating a resonance of a first antenna according to a change of a ground position of FIG. 16A according to an embodiment of the disclosure.
Figure 16C:
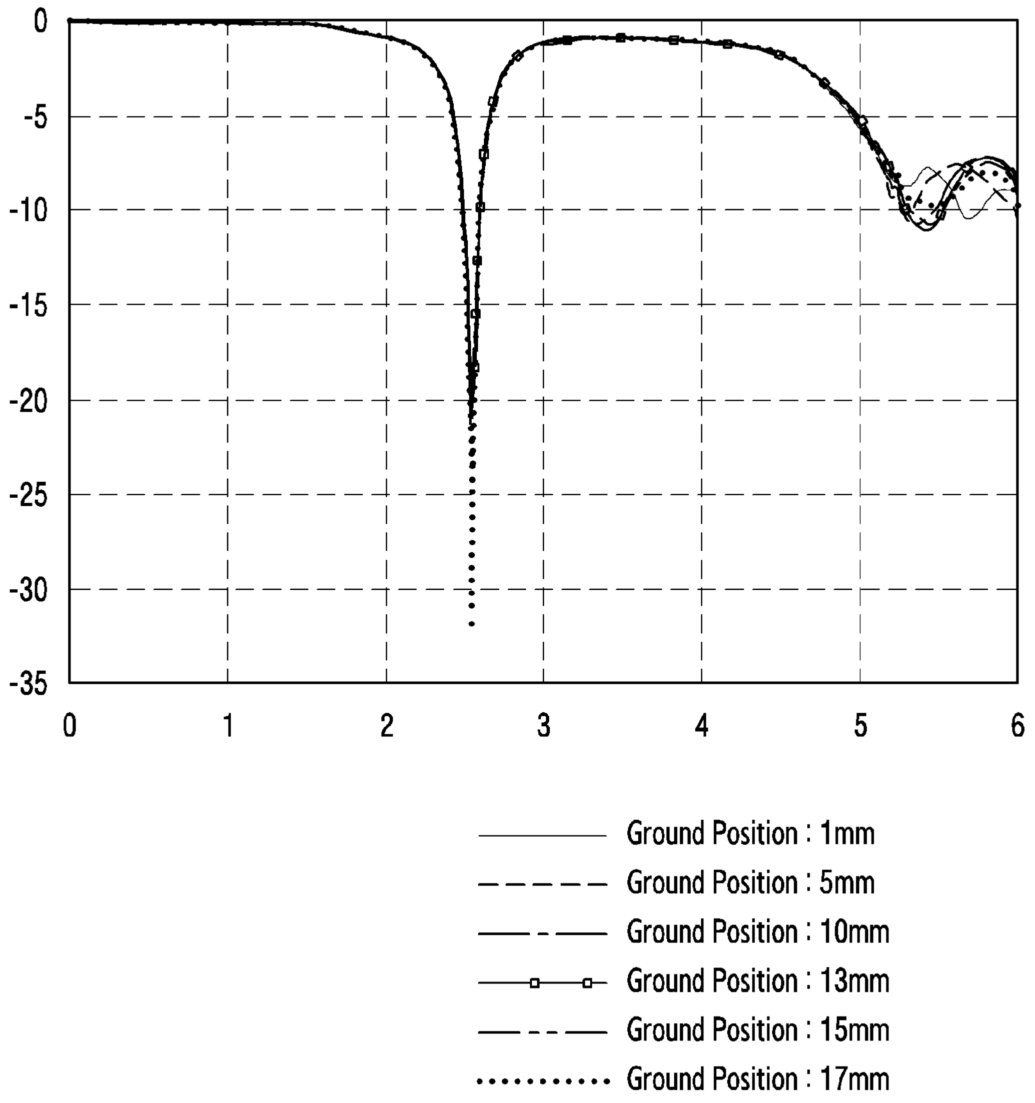
FIG. 16C is a graph illustrating a resonance of a second antenna according to a change of a ground position of FIG. 16A according to an embodiment of the disclosure.

FIG. 16B is a graph illustrating a resonance of the first slot according to a change of a ground position of FIG. 16A according to an embodiment of the disclosure.

Referring to FIG. 16B, as the ground position provided on a second conductive frame 220 is located farther away from a first point 1611, the resonance frequency of a first slot 512 may increase.

According to an embodiment, when the first distance 1612 is about 1 mm, the first slot 512 may resonate in a frequency band of about 1.73 GHz to about 1.75 GHz.

According to an embodiment, when the first distance 1612 is about 17 mm, the first slot 512 may resonate in a frequency band of about 1.8 GHz.

According to an embodiment, as the position of the ground point provided on the second conductive frame 220 is closer to the first conductive frame 210 due to the increase of the first distance 1612, the frequency band in which the first slot 512 resonates may increase.

FIG. 16C is a graph illustrating a resonance of the second slot according to a change of a ground position of FIG. 16A according to an embodiment of the disclosure.

Referring to FIG. 16C, even if the ground position provided on a second conductive frame 220 is farther away from a first point 1611, the resonance frequency of a second slot 522 may not substantially change.

According to an embodiment, when the first distance 1612 is about 1 mm, the second slot 522 may resonate in a frequency band of about 2.5 GHz.

According to an embodiment, when the first distance 1612 is about 17 mm, the second slot 522 may resonate in a frequency band of about 2.5 GHz.

According to an embodiment, even if the position of the ground point provided on the second conductive frame 220 is closer to the first conductive frame 210 due to the increase of the first distance 1612, there may be little effect on the resonance frequency of the second slot 522.

Figure 17A:
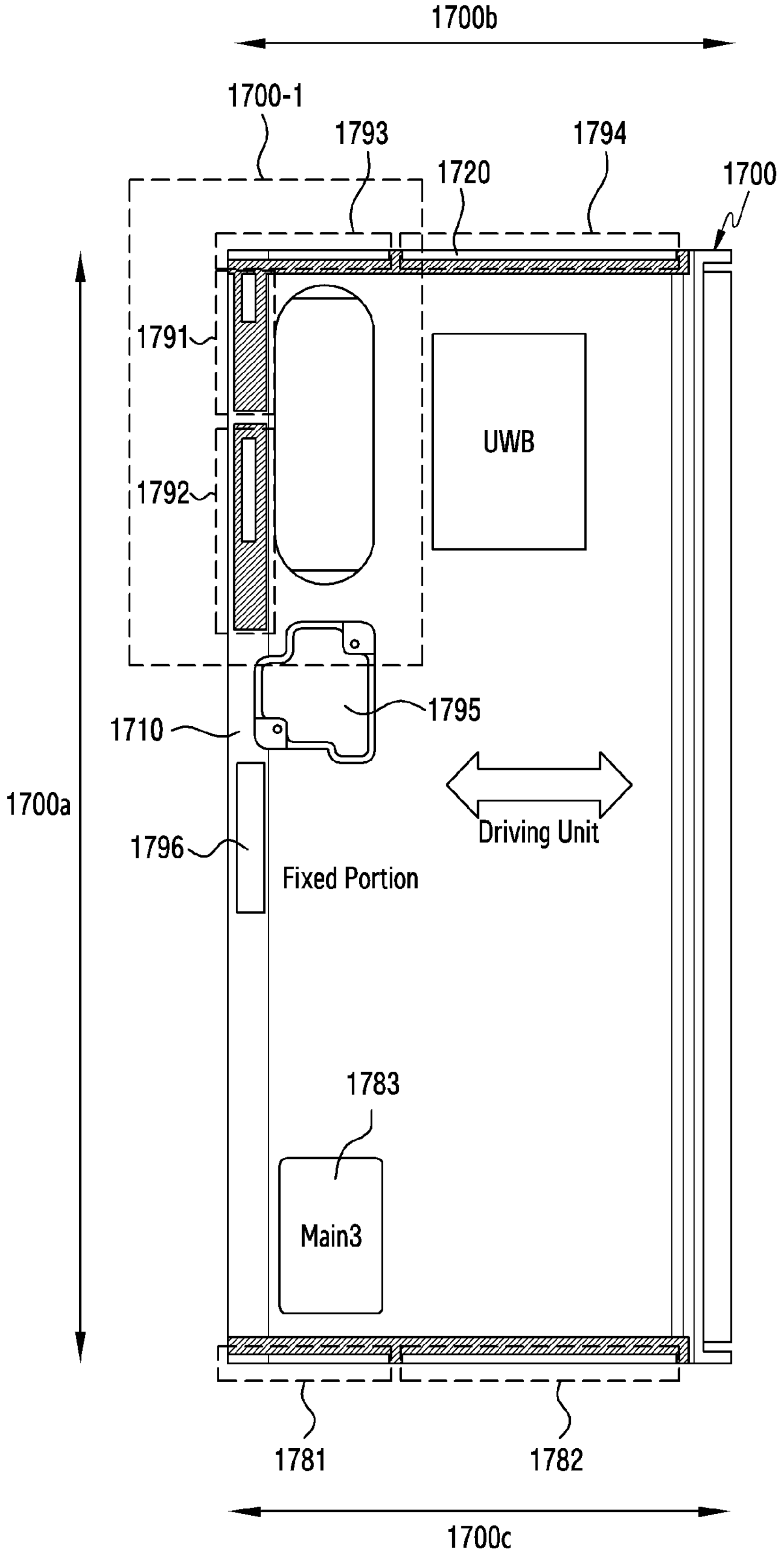
FIG. 17A illustrates an electronic device according to an embodiment of the disclosure.

FIG. 17A illustrates an electronic device according to an embodiment of the disclosure.

Referring to FIG. 17A, an electronic device 1700 may be a rollable electronic device in which an antenna structure is disposed in a driving unit. In an example, the electronic device 1700 may include a first main antenna portion 1781, a second main antenna portion 1782, a third main antenna portion 1783, a first sub-antenna portion 1793, a second sub-antenna portion 1794, a third sub-antenna portion 1791, a fourth sub-antenna portion 1792, a fifth sub-antenna portion 1795, and/or a mmWave antenna module 1796. At least one main antenna portion or at least one sub-antenna portion may generate a resonance in the same or different frequency bands. The mmWave antenna module 1796 may be used for wireless communication with an external device in a mmWave frequency band.

According to an embodiment, the third sub-antenna portion 1791 may be understood as a first slot antenna, and the fourth sub-antenna portion 1792 may be understood as a second slot antenna. In an example, the third sub-antenna portion 1791 and the fourth sub-antenna portion 1792 may be understood as components corresponding to the first region 510 and the second region 520.

According to an embodiment, the electronic device 1700 may include a first conductive frame 1710 that configures a portion of a first edge 1700*a* and a second conductive frame 1720 that configures a second edge 1700*b*. In an example, the first edge 1700*a* and the second edge 1700*b* may be substantially perpendicular to each other. In an example, the electronic device 1700 may include a third edge 1700*c*.

According to an embodiment, an antenna may be provided in a first region 1700-1 of the electronic device 1700. A detailed description of the first region 1700-1 will be made later with reference to FIG. 17B.

Figure 17B:
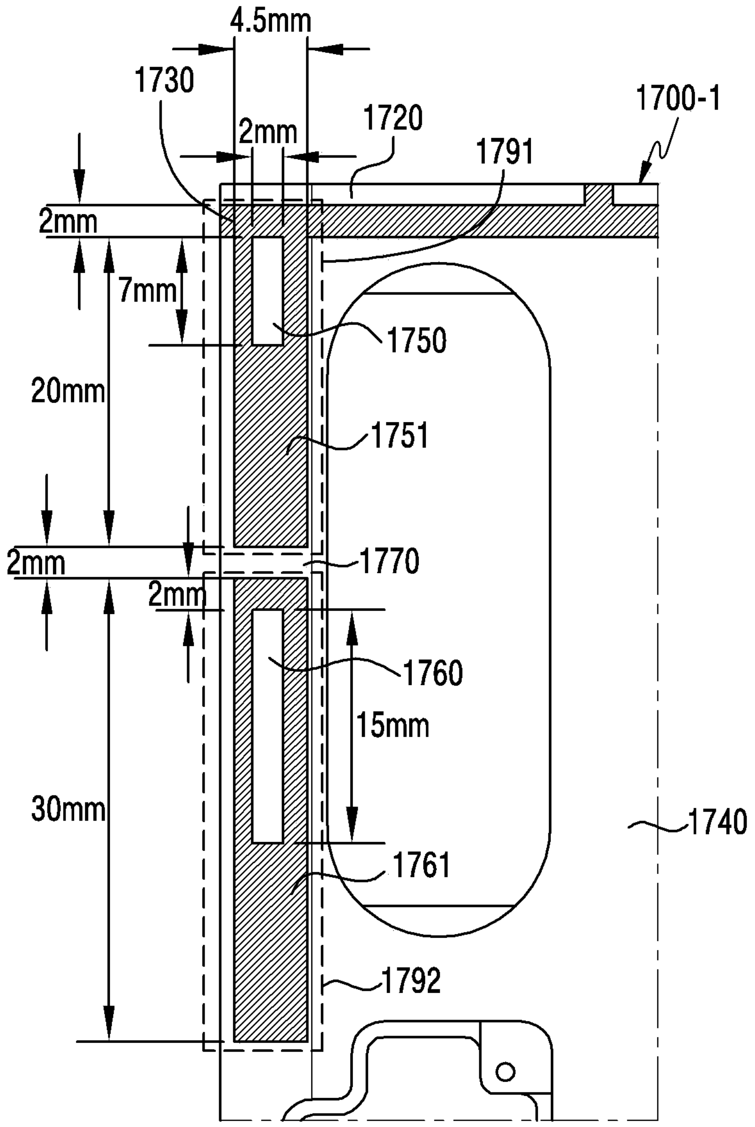
FIG. 17B illustrates a first antenna and a second antenna included in the electronic device of FIG. 17A according to an embodiment of the disclosure.

FIG. 17B illustrates a first slot antenna portion and a second slot antenna portion included in an electronic device of FIG. 17A according to an embodiment of the disclosure.

Referring to FIG. 17B, a first region 1700-1 of an electronic device 1700 may be provided with a first conductive frame 1710, a second conductive frame 1720, a split portion 1730, a conductive structure 1740, a first conductive member 1750, a second conductive member 1760, a conductive portion 1770, a first slot 1751, or a second slot 1761. In an example, the first conductive frame 1710, the second conductive frame 1720, the split portion 1730, the conductive structure 1740, the first conductive member 1750, the second conductive member 1760, the conductive portion 1770, the first slot 1751, and the second slot 1761 may be understood as being substantially the same components as the first conductive frame 210, the second conductive frame 220, the split portion 230, the conductive structure 240, the first conductive member 250, the second conductive member 260, the conductive portion 270, the first slot 512, and the second slot 522, respectively, which are illustrated in FIG. 2. For example, the first slot 1751 or the second slot 1761 may be filled with a dielectric material having a specific dielectric constant.

According to an embodiment, the first slot antenna portion (e.g., the third sub-antenna portion 1791) may include at least a portion of the first conductive frame 1710, the first conductive member 1750, or the first slot 1751. In an example, the first slot antenna portion (e.g., the third sub-antenna portion 1791) may have a width of about 20 mm, and the first conductive member 1750 may have widths of about 7 mm and about 2 mm. In addition, the first slot 1751 may have a width of about 4.5 mm.

According to an embodiment, the second slot antenna portion (e.g., the fourth sub-antenna portion 1792) may include at least a portion of the first conductive frame 1710, the second conductive member 1760, or the second slot 1761. In an example, the second slot antenna portion (e.g., the fourth sub-antenna portion 1792) may have a width of about 30 mm, and the second conductive member 1760 may have widths of about 15 mm and about 2 mm. In addition, the second slot 1761 may have a width of about 4.5 mm.

According to an embodiment, the split portion 1730 may have a width of about 2 mm.

According to an embodiment, the conductive portion 1770 may have a width of about 2 mm.

Figure 18A:
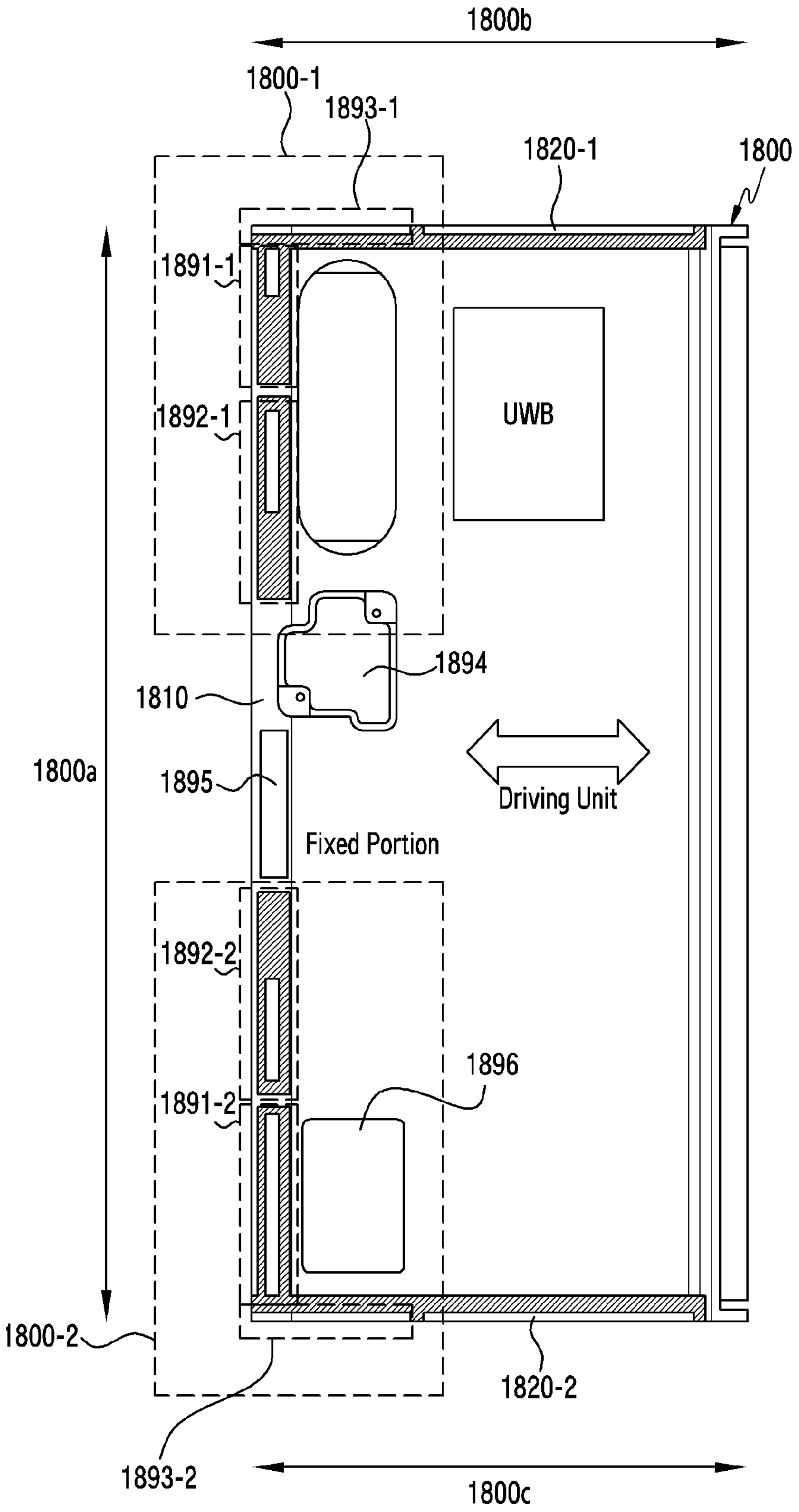
FIG. 18A illustrates an electronic device according to an embodiment of the disclosure.

FIG. 18A illustrates an electronic device according to an embodiment of the disclosure.

Referring to FIG. 18A, an electronic device 1800 may be a rollable electronic device in which an antenna structure is not disposed in a driving unit. In an example, the electronic device 1800 may include a first main antenna portion 1893-2, a second main antenna portion 1891-2, a third main antenna portion 1896, a first sub-antenna portion 1893-1, a second sub-antenna portion 1891-1, a third sub-antenna portion 1892-1, a fourth sub-antenna portion 1892-2, a fifth sub-antenna portion 1894, and/or a mmWave antenna module 1895. For example, at least one main antenna portion or at least one sub-antenna portion may generate a resonance in the same or different frequency bands. The mmWave antenna module 1895 may be used for wireless communication with an external device in a mmWave frequency band.

According to an embodiment, the electronic device 1800 may include a first conductive frame 1810 that configures a portion of a first edge 1800*a*, a second conductive frame 1820-1 that configures a second edge 1800*b*, and a third conductive frame 1820-2 that configures a third edge 1800*c*. In an example, the first edge 1800*a* and the second edge 1800*b* may be substantially perpendicular to each other. In another example, the first edge 1800*a* and the third edge 1800*c* may be substantially perpendicular to each other.

According to an embodiment, the second sub-antenna portion 1891-1 may be understood as a first slot antenna portion, and the third sub-antenna portion 1892-1 may be understood as a second slot antenna portion. In an example, the second sub-antenna portion 1891-1 and the third sub-antenna portion 1892-1 may be understood as components corresponding to the first region 510 and the second region 520.

According to an embodiment, the second main antenna portion 1891-2 may be understood as the third slot antenna portion and the fourth sub-antenna portion 1892-2 may be understood as a fourth slot antenna portion. In an example, the second main antenna portion 1891-2 and the fourth sub-antenna portion 1892-2 may be understood as components corresponding to the first region 510 and the second region 520.

According to an embodiment, the antennas may be provided in a first region 1800-1 of the electronic device 1800 and a second region 1800-2 of the electronic device 1800. A detailed description of the first region 1800-1 and the second region 1800-2 will be described later with reference to FIGS. 18B and 18C, respectively.

Figure 18B:
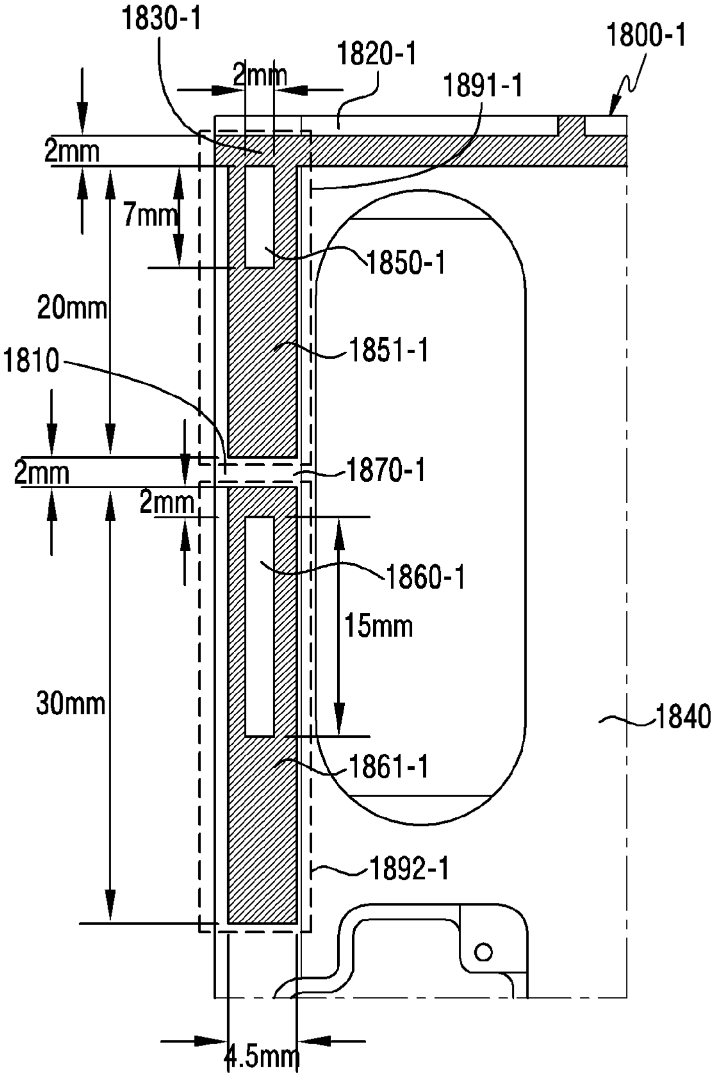
FIG. 18B illustrates a first antenna and a second antenna included in the electronic device of FIG. 18A according to an embodiment of the disclosure.

FIG. 18B illustrates a first slot antenna portion and a second slot antenna portion included in the electronic device of FIG. 18A according to an embodiment of the disclosure.

Referring to FIG. 18B, a first region 1800-1 of an electronic device 1800 may be provided with a first conductive frame 1810, a second conductive frame 1820-1, a split portion 1830-1, a conductive structure 1840, a first conductive member 1850-1, a second conductive member 1860-1, a conductive portion 1870-1, a first slot 1851-1, and/or a second slot 1861-1. In an example, the first conductive frame 1810, the second conductive frame 1820-1, the split portion 1830-1, the conductive structure 1840, the first conductive member 1850-1, the second conductive member 1860-1, the conductive portion 1870-1, the first slot 1851-1, and the second slot 1861-1 may be understood as being substantially the same components as the first conductive frame 210, the second conductive frame 220, the split portion 230, the conductive structure 240, the first conductive member 250, the second conductive member 260, the conductive portion 270, the first slot 512, and the second slot 522, respectively, which are illustrated in FIG. 2. For example, the first slot 1851-1 or the second slot 1861-1 may be filled with a dielectric material having a specific dielectric constant.

According to an embodiment, the first slot antenna portion (e.g., the second sub-antenna portion 1891-1) may include at least a portion of the first conductive frame 1810, the first conductive member 1850-1, or the first slot 1851-1. In an example, the first slot antenna portion (e.g., the second sub-antenna portion 1891-1) may have a width of about 20 mm, and the first conductive member 1850-1 may have widths of about 7 mm and about 2 mm. In another example, the first slot 1851-1 may have a width of about 4.5 mm.

According to an embodiment, the second slot antenna portion (e.g., the third sub-antenna portion 1892-1) may include at least a portion of the first conductive frame 1810, the second conductive member 1860-1, or the second slot 1861-1. In an example, the second slot antenna portion (e.g., the third sub-antenna portion 1892-1) may have a width of about 30 mm, and the second conductive member 1860-1 may have widths of about 15 mm and about 2 mm. In another example, the second slot 1861-1 may have a width of about 4.5 mm.

According to an embodiment, the split portion 1830-1 may have a width of about 2 mm.

According to an embodiment, the conductive portion 1870-1 may have a width of about 2 mm.

Figure 18C:
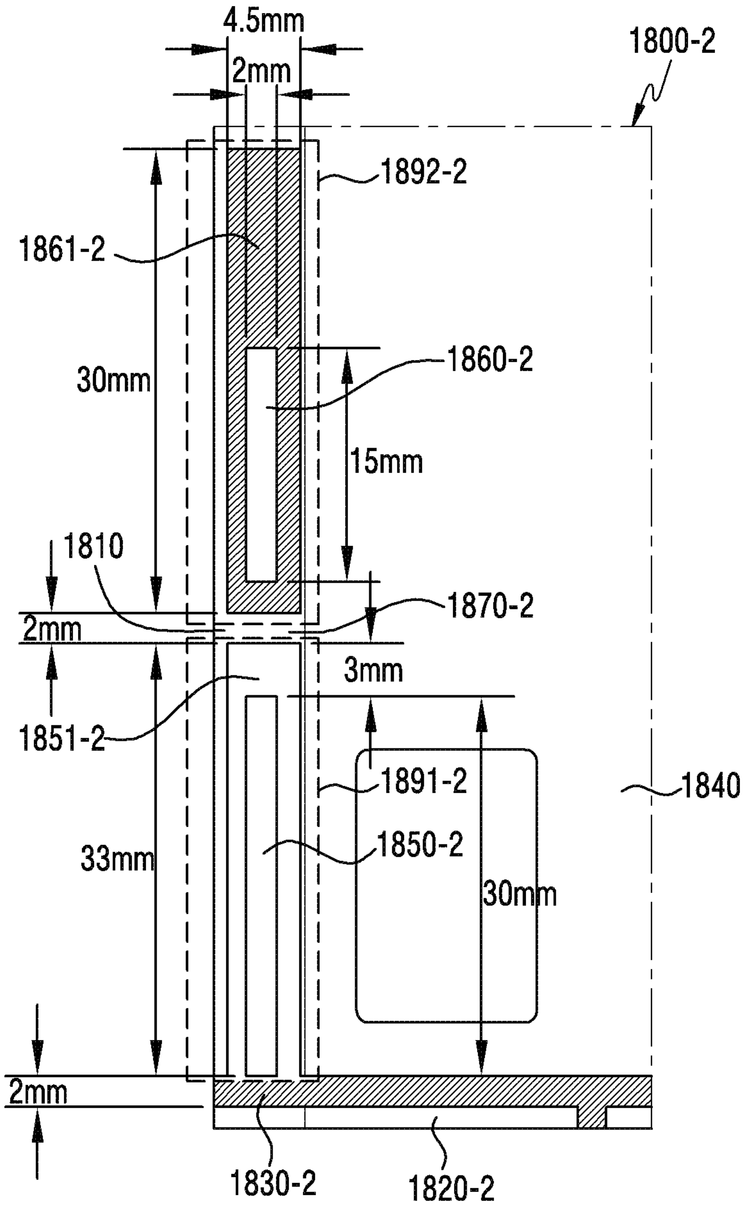
FIG. 18C illustrates a third antenna and a fourth antenna included in the electronic device of FIG. 18A according to an embodiment of the disclosure.

FIG. 18C illustrates a third slot antenna portion and a fourth slot antenna portion included in the electronic device of FIG. 18A according to an embodiment of the disclosure.

Referring to FIG. 18C, the second region 1800-2 of the electronic device 1800 may be provided with a first conductive frame 1810, a third conductive frame 1820-2, a split portion 1830-2, a conductive structure 1840, a third conductive member 1850-2, a fourth conductive member 1860-2, a conductive portion 1870-2, a third slot 1851-2, and/or a fourth slot 1861-2. In an example, the first conductive frame 1810, the third conductive frame 1820-2, the split portion 1830-2, the conductive structure 1840, the third conductive member 1850-2, the fourth conductive member 1860-2, the conductive portion 1870-2, the third slot 1851-2, and the fourth slot 1861-2 may be understood as being substantially the same components as the first conductive frame 210, the second conductive frame 220, the split portion 230, the conductive structure 240, the first conductive member 250, the second conductive member 260, the conductive portion 270, the first slot 512, and the second slot 522, respectively, which are illustrated in FIG. 2. For example, the third slot 1851-2 or the fourth slot 1861-2 may be filled with a dielectric material having a specific dielectric constant.

According to an embodiment, a third slot antenna portion (e.g., the second main antenna portion 1891-2) may include at least a portion of the first conductive frame 1810, the third conductive member 1850-2, and/or the third slot 1851-2. In an example, the third slot antenna portion (e.g., the second main antenna portion 1891-2) may have a width of about 33 mm, and the third conductive member 1850-2 may have widths of about 30 mm and about 2 mm. In another example, the third slot 1851-2 may have a width of about 4.5 mm.

According to an embodiment, the fourth slot antenna portion (e.g., the fourth sub-antenna portion 1892-2) may include at least a portion of the first conductive frame 1810, the fourth conductive member 1860-2, or the fourth slot 1861-2. In an example, the fourth slot antenna portion (e.g., the fourth sub-antenna portion 1892-2) may have a width of about 30 mm, and the fourth conductive member 1860-2 may have widths of about 15 mm and about 2 mm. In another example, the fourth slot 1861-2 may have a width of about 4.5 mm.

According to an embodiment, the split portion 1830-2 may have a width of about 2 mm.

According to an embodiment, the conductive portion 1870-2 may have a width of about 2 mm.

Figure 19:
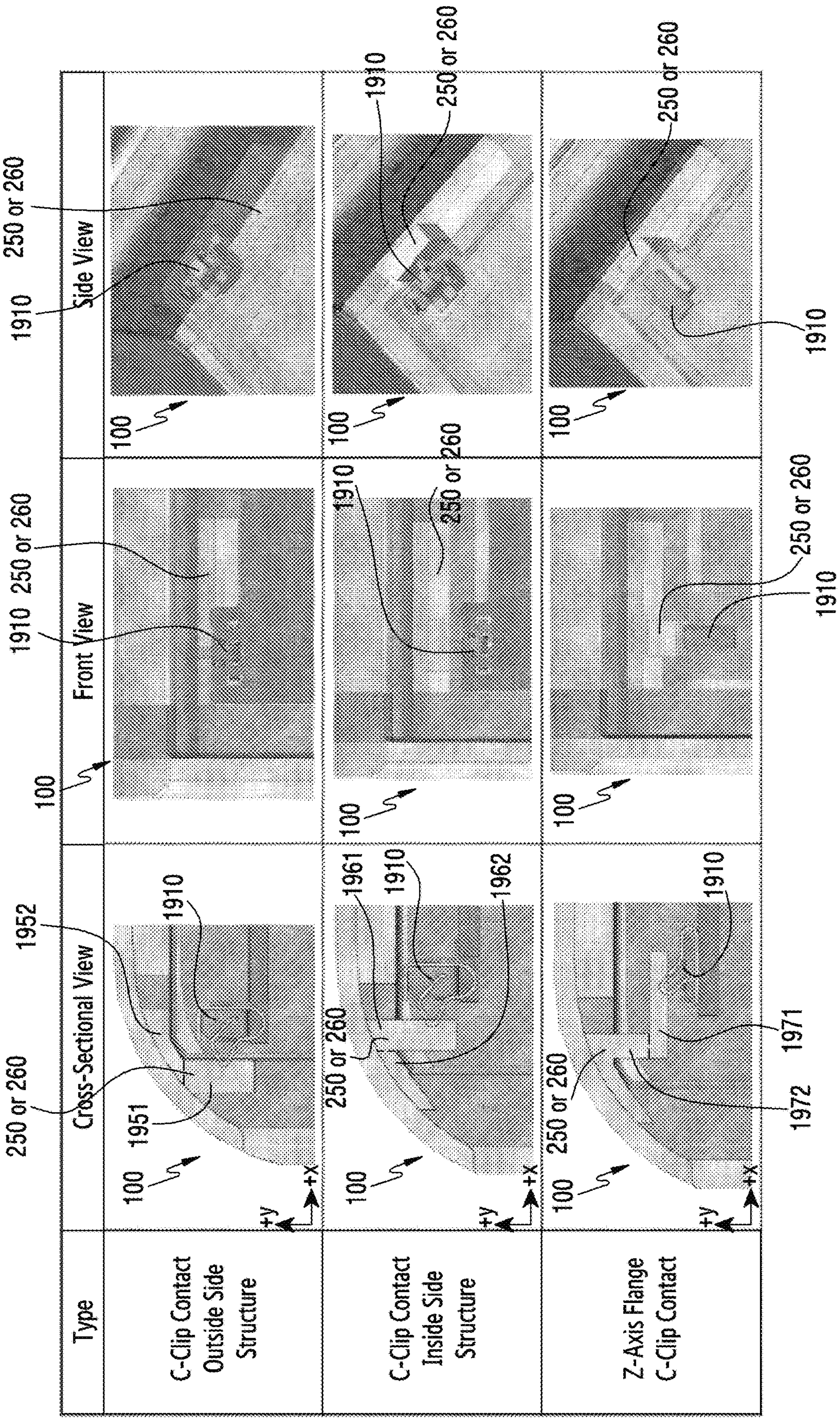
FIG. 19 illustrates a structure for feeding power to a first conductive member or a second conductive member according to an embodiment of the disclosure.

FIG. 19 illustrates a structure for feeding power to a first conductive member or a second conductive member according to an embodiment of the disclosure.

Referring to FIG. 19, a C-clip 1910 may be provided in an electronic device 100 in order to feed power to a first conductive member 250 or a second conductive member 260.

According to an embodiment, the wireless communication circuit 280 may feed power to the first conductive member 250 or the second conductive member 260 having a structure shape of the lateral direction via the C-clip 1910. In an example, the wireless communication circuit 280 may be configured to feed power to the first conductive member 250 or the second conductive member 260 with which the C-clip 1910 disposed on the printed circuit board is in contact in the lateral direction.

According to an embodiment, the first conductive member 250 or the second conductive member 260 may have various shapes. For example, the first conductive member 250 (or the second conductive member 260) may include a first portion 1951 extending in a first direction (e.g., the +y-direction) and a second portion 1952 extending in a second direction (e.g., the +x direction) from one end of the first portion 1951. In an example, the first portion 1951 may refer to a portion that is in contact with the C-clip 1910. Hereinafter, the structure of the first conductive member 250 (or the second conductive member 260) of an example may be referred to as a first structure (or a structure outside the structure of the lateral direction).

As another example, the first conductive member 250 (or the second conductive member 260) may include a first portion 1961 extending in a first direction (e.g., the +y-direction) and a second portion 1962 extending in a second direction (e.g., the −x direction) from one end of the first portion 1961. In an example, the first portion 1961 may refer to a portion that is in contact with the C-clip 1910. Hereinafter, the structure of the first conductive member 250 (or the second conductive member 260) of an example may be referred to as a second structure (or a structure inside the structure of lateral direction).

As another example, the first conductive member 250 (or the second conductive member 260) may include a first portion 1971 extending in a second direction (e.g., the +x-direction) and a second portion 1972 extending in a first direction (e.g., the +y direction) from one end of the first portion 1971. In an example, the first portion 1971 may refer to a portion that is in contact with the C-clip 1910. Hereinafter, the structure of the first conductive member 250 (or the second conductive member 260) of an example may be referred to as a third structure (or a flange-shaped structure).

According to an embodiment, the wireless communication circuit 280 may feed power to the first conductive member 250 or the second conductive member 260 having a structure shape of the direction via the C-clip 1910. In an example, the wireless communication circuit 280 may be configured to feed power to the first conductive member 250 or the second conductive member 260 with which the C-clip 1910 disposed on the printed circuit board is in contact in the lateral direction.

According to an embodiment, the wireless communication circuit 280 may feed power to the flange-shaped first conductive member 250 or the second conductive member 260 via the C-clip 1910. In an example, the wireless communication circuit 280 may be configured to feed power to the first conductive member 250 or the second conductive member 260 with which the C-clip 1910 disposed on the printed circuit board is in contact in the upward direction.

Figure 20:
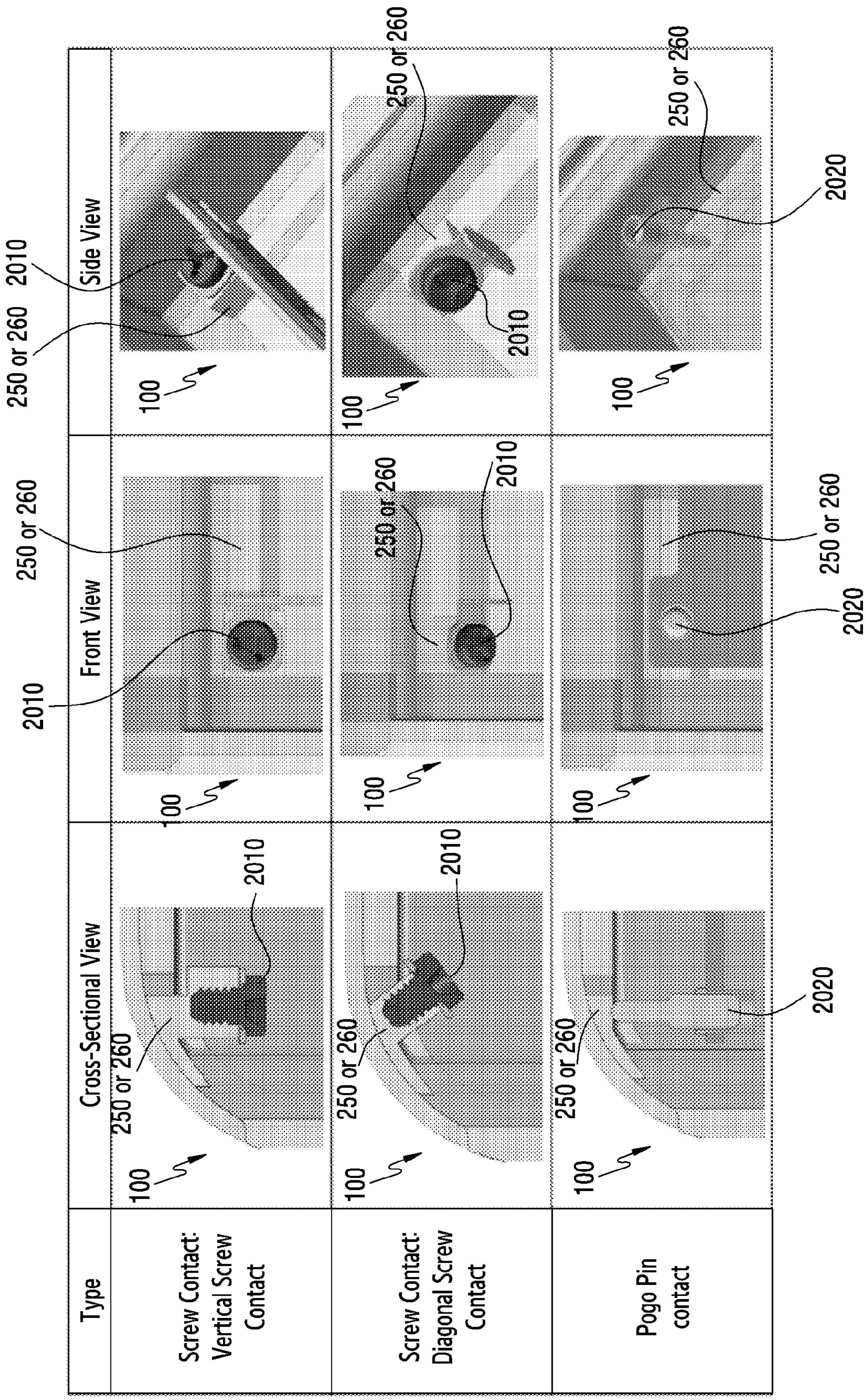
FIG. 20 illustrates a structure for feeding power to a first conductive member or a second conductive member according to an embodiment of the disclosure.

FIG. 20 illustrates a structure for feeding power to a first conductive member or a second conductive member according to an embodiment of the disclosure.

Referring to FIG. 20, a screw 2010 or a pogo pin 2020 may be provided in an electronic device 100 in order to feed power to a first conductive member 250 or a second conductive member 260.

According to an embodiment, the wireless communication circuit 280 may feed power to the first conductive member 250 or the second conductive member 260 in a vertical direction via the screw 2010. In an example, the wireless communication circuit 280 may be configured to feed power to the first conductive member 250 or the second conductive member 260 with which the screw 2010 disposed on the printed circuit board is in contact in the vertical direction.

According to an embodiment, the wireless communication circuit 280 may feed power to the first conductive member 250 or the second conductive member 260 in a diagonal direction via the screw 2010. In an example, the wireless communication circuit 280 may be configured to feed power to the first conductive member 250 or the second conductive member 260 with which the screw 2010 disposed on the printed circuit board is in contact in the diagonal direction.

According to an embodiment, the wireless communication circuit 280 may feed power to the first conductive member 250 or the second conductive member 260 via a pogo pin 2020. In an example, the wireless communication circuit 280 may be configured to feed power to the first conductive member 250 or the second conductive member 260 with which the pogo pin 2020 disposed on the printed circuit board is in contact.

Figure 21:
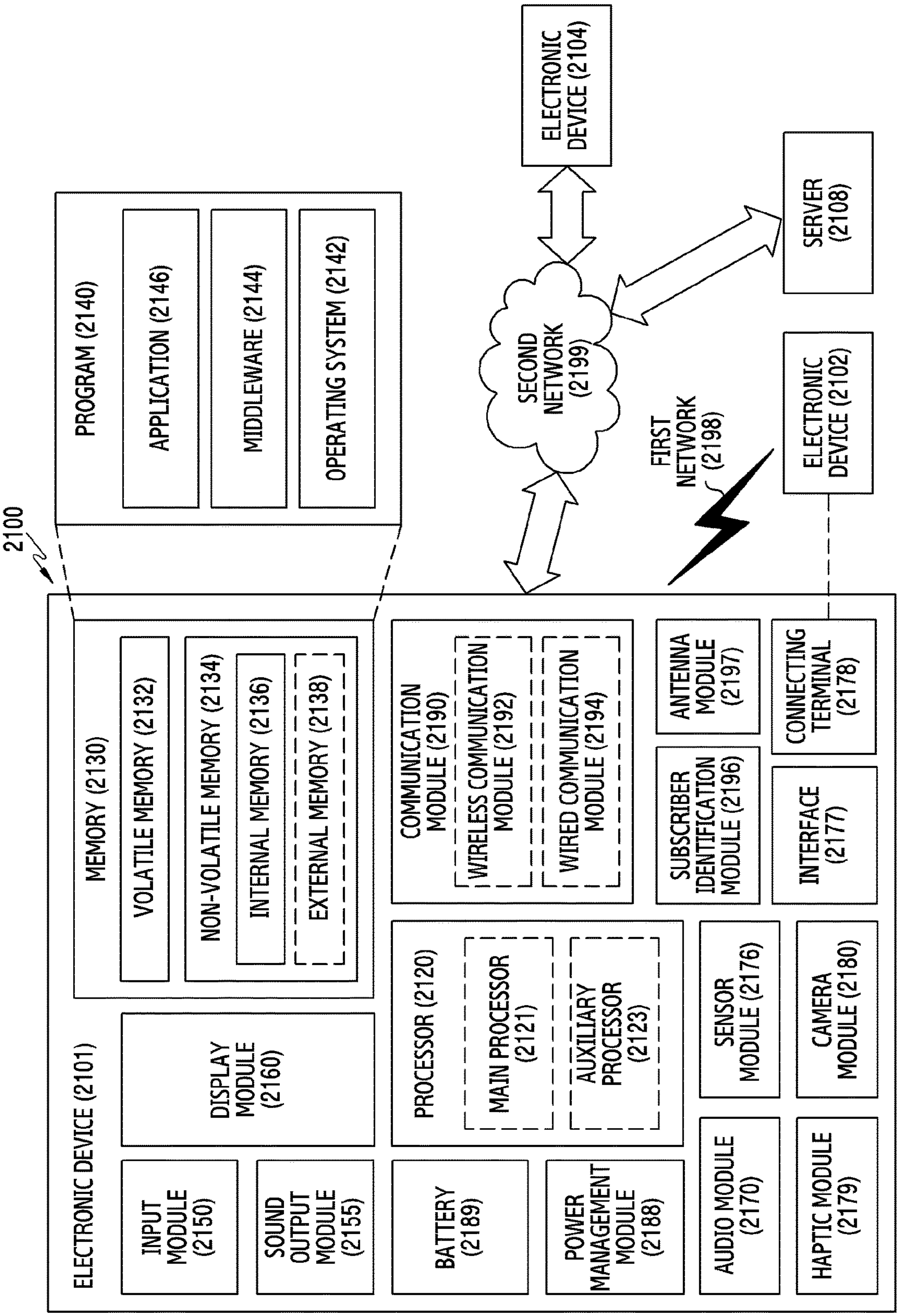
FIG. 21 is a block diagram of an electronic device according to various embodiments in a network environment according to the embodiment of the disclosure.

FIG. 21 is a block diagram illustrating an electronic device in a network environment according to an embodiment of the disclosure.

Referring to FIG. 21, the electronic device 2101 in the network environment 2100 may communicate with an electronic device 2102 via a first network 2198 (e.g., a short-range wireless communication network), or at least one of an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input module 2150, a sound output module 2155, a display module 2160, an audio module 2170, a sensor module 2176, an interface 2177, a connecting terminal 2178, a haptic module 2179, a camera module 2180, a power management module 2188, a battery 2189, a communication module 2190, a subscriber identification module (SIM) 2196, or an antenna module 2197. In some embodiments, at least one of the components (e.g., the connecting terminal 2178) may be omitted from the electronic device 2101, or one or more other components may be added in the electronic device 2101. In some embodiments, some of the components (e.g., the sensor module 2176, the camera module 2180, or the antenna module 2197) may be implemented as a single component (e.g., the display module 2160).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may store a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), or an auxiliary processor 2123 (e.g., a graphics processing unit (GPU), a neural processing unit (NPU), an image signal processor (ISP), a sensor hub processor, or a communication processor (CP)) that is operable independently from, or in conjunction with, the main processor 2121. For example, when the electronic device 2101 includes the main processor 2121 and the auxiliary processor 2123, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display module 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123. According to an embodiment, the auxiliary processor 2123 (e.g., the neural processing unit) may include a hardware structure specified for artificial intelligence model processing. An artificial intelligence model may be generated by machine learning. Such learning may be performed, e.g., by the electronic device 2101 where the artificial intelligence is performed or via a separate server (e.g., the server 2108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2130 may store various data used by at least one component (e.g., the processor 2120 or the sensor module 2176) of the electronic device 2101. The various data may include, for example, software (e.g., the program 2140) and input data or output data for a command related thererto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input module 2150 may receive a command or data to be used by another component (e.g., the processor 2120) of the electronic device 2101, from the outside (e.g., a user) of the electronic device 2101. The input module 2150 may include, for example, a microphone, a mouse, a keyboard, a key (e.g., a button), or a digital pen (e.g., a stylus pen).

The sound output module 2155 may output sound signals to the outside of the electronic device 2101. The sound output module 2155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2160 may visually provide information to the outside (e.g., a user) of the electronic device 2101. The display module 2160 may include, for example, a display, a hologram device, or a projector and control circuitry to control a corresponding one of the display, hologram device, and projector. According to an embodiment, the display module 2160 may include a touch sensor adapted to detect a touch, or a pressure sensor adapted to measure the intensity of force incurred by the touch.

The audio module 2170 may convert a sound into an electrical signal and vice versa. According to an embodiment, the audio module 2170 may obtain the sound via the input module 2150, or output the sound via the sound output module 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The wireless communication module 2192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2192 may support a high-frequency band (e.g., the mmWave band) to achieve, e.g., a high data transmission rate. The wireless communication module 2192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2192 may support various requirements specified in the electronic device 2101, an external electronic device (e.g., the electronic device 2104), or a network system (e.g., the second network 2199). According to an embodiment, the wireless communication module 2192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., a printed circuit board (PCB)). According to an embodiment, the antenna module 2197 may include a plurality of antennas (e.g., array antennas). In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

According to various embodiments, the antenna module 2197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 or 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, mobile edge computing (MEC), or client-server computing technology may be used, for example. The electronic device 2101 may provide ultra low-latency services using, e.g., distributed computing or mobile edge computing. In another embodiment, the external electronic device 2104 may include an internet-of-things (IoT) device. The server 2108 may be an intelligent server using machine learning and/or a neural network. According to an embodiment, the external electronic device 2104 or the server 2108 may be included in the second network 2199. The electronic device 2101 may be applied to intelligent services (e.g., smart home, smart city, smart car, or healthcare) based on 5G communication technology or IoT-related technology.

An electronic device according to various embodiments disclosed herein may include: a first conductive frame forming a first edge of the electronic device; a second conductive frame that configures a second edge perpendicular to the first edge; a split portion provided at one end of the first edge to electrically separate the first conductive frame and the second conductive frame from each other, wherein the split portion extends along the second edge in a direction perpendicular to the first edge; a conductive structure disposed inside the electronic device; a first conductive member spaced apart from the first conductive frame and the second conductive frame and disposed along the first edge;

a second conductive member spaced apart from the first conductive frame and the first conductive member and disposed along the first edge; a conductive portion extending from a point of the first conductive frame or the conductive structure and located between the first conductive member and the second conductive member; and a wireless communication circuit electrically connected to the first conductive member and the second conductive member, wherein the wireless communication circuit may be configured to transmit and/or receive a radio signal by using at least a portion of an electric path provided by the first conductive frame, the first conductive member, the second conductive member, the conductive portion, and the conductive structure by feeding power to the first conductive member and/or the second conductive member.

According to an embodiment, the first conductive member and the second conductive member may be surrounded by a dielectric material having a specific dielectric constant.

According to an embodiment, the first conductive member may include a first feeding point and a first ground point.

According to an embodiment, the second conductive member may include a second feeding point and a second ground point.

The electronic device according to an embodiment may further include a first region, wherein the first region may include a first portion of the first conductive frame, the first conductive member, and a first non-conductive member.

The electronic device according to an embodiment may further include a second region, wherein the second region may include a second portion of the first conductive frame, the second conductive member, and a second non-conductive member.

According to an embodiment, the first region may be in contact with the split portion.

According to an embodiment, the second region may have a width in a second range, and the width in the second range may not exceed twice the width of the second conductive member.

According to an embodiment, the split portion may have a width in a third range, and the width in the third range may be 2 mm.

According to an embodiment, the conductive portion may have a width in a fourth range, and the fourth range may be 5 mm or less.

According to an embodiment, when the wireless communication circuit feeds power to the first conductive member, a first resonance may be formed in the first region.

The electronic device according to an embodiment may further include a first region, wherein the first region may include a first portion of the first conductive frame, the first conductive member, and a first non-conductive member, and when the wireless communication circuit feeds power to the second conductive member, a second resonance may be formed in the first region.

The electronic device according to an embodiment may further include a second region, wherein the second region may include a second portion of the first conductive frame, the second conductive member, and a second non-conductive member, and when the wireless communication circuit feeds power to the first conductive member, a third resonance may be formed in the second region.

The electronic device according to an embodiment may further include a second region, wherein the second region may include a second portion of the first conductive frame, the second conductive member, and a second non-conductive member, and when the wireless communication circuit feeds power to the second conductive member, a fourth resonance may be formed in the second region.

According to an embodiment, coupling feeding may occur when the wireless communication circuit feeds power to the first conductive member or the second conductive member.

An electronic device according to various embodiments disclosed herein may include: a first conductive frame forming a first edge of the electronic device; a second conductive frame that configures a second edge perpendicular to the first edge; a split portion provided at one end of the first edge to electrically separate the first conductive frame and the second conductive frame from each other, wherein the split portion extends along the second edge in a direction perpendicular to the first edge; a conductive structure disposed inside the electronic device; a first conductive member spaced apart from the first conductive frame and the second conductive frame and disposed along the first edge; a first slot surrounding the first conductive member; a second conductive member spaced apart from the first conductive frame and the first conductive member and disposed along the first edge; a second slot surrounding the second conductive member; a conductive portion extending from a point of the first conductive frame or the conductive structure and located between the first conductive member and the second conductive member; and a wireless communication circuit electrically connected to the first conductive member and the second conductive member, wherein the wireless communication circuit may be configured to transmit and/or receive a radio signal by using at least one of the first slot or the second slot by feeding power to the first conductive member and/or the second conductive member.

According to an embodiment, the first slot or the second slot may be filled with a dielectric material having a specific dielectric constant.

According to an embodiment, the first conductive member may include a first feeding point and a first ground point.

According to an embodiment, the second conductive member may include a second feeding point and a second ground point.

According to an embodiment, the split portion may have a width in a third range, and the width in the third range may be 2 mm.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "Ist" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first conductive frame forming a first edge of the electronic device, the first conductive frame including a first portion for a first frequency band and a second portion for a second frequency band;

a second conductive frame forming a second edge of the electronic device, the second edge being perpendicular to the first edge;

a split portion disposed between the first conductive frame and the second conductive frame, wherein the split portion extends along the second edge;

a conductive structure disposed in the electronic device;

a first conductive member spaced apart from the first conductive frame and the conductive structure and disposed along the first portion;

a second conductive member spaced apart from the first conductive frame and the conductive structure and disposed along the second portion;

a conductive portion electrically connecting the first conductive frame and the conductive structure and disposed between the first conductive member and the second conductive member;

a wireless communication circuit configured to transmit and/or receive radio signals of the first frequency band and the second frequency band by using at least a portion of an electric path formed in the first conductive frame, the first conductive member, the second conductive member, the conductive portion, and the conductive structure by feeding power to the first conductive member and/or the second conductive member;

a first matching circuit electrically connecting the first conductive member with a ground for adjusting the second frequency band; and a second matching circuit electrically connecting the second conductive member with the ground for adjusting the first frequency band.

2. The electronic device of claim 1, wherein the first conductive member and the second conductive member are surrounded by a dielectric material having a specific dielectric constant.

3. The electronic device of claim 2, wherein the first conductive member includes a first feeding point and a first ground point.

4. The electronic device of claim 1, wherein the second conductive member includes a second feeding point and a second ground point.

5. The electronic device of claim 1, wherein, in case that the wireless communication circuit feeds power to the first conductive member, an electric path corresponding to a first resonance is formed in the first portion of the first conductive frame, the conductive portion, and the conductive structure.

6. The electronic device of claim 1, further comprising:

a first region, wherein the first region includes the first portion of the first conductive frame, the first conductive member, and a first non-conductive member, and wherein, in case that the wireless communication circuit feeds power to the second conductive member, an electric path corresponding to a second resonance is formed in the first region.

7. The electronic device of claim 1, further comprising:

a second region, wherein the second region includes the second portion of the first conductive frame, the second conductive member, and a second non-conductive member, and wherein, in case that the wireless communication circuit feeds power to the first conductive member, an electric path corresponding to a third resonance is formed in the second region.

8. The electronic device of claim 1, further comprising:

a second region, wherein the second region includes the second portion of the second conductive frame, the first conductive member, and a second non-conductive member, and wherein, in case that the wireless communication circuit feeds power to the second conductive member, an electric path corresponding to a fourth resonance is formed in the second region.

9. The electronic device of claim 1, wherein coupling feeding occurs in response to the wireless communication circuit feeding power to one of the first conductive member or the second conductive member.

10. An electronic device comprising:

a first conductive frame forming a first edge of the electronic device, the first conductive frame including a first portion for a first frequency band and a second portion for a second frequency band;

a second conductive frame forming a second edge of the electronic device, the second edge being perpendicular to the first edge;

a split portion disposed between the first conductive frame and the second conductive frame, wherein the split portion extends along the second edge;

a conductive structure disposed in the electronic device;

a first conductive member spaced apart from the first conductive frame and the conductive structure and disposed along the first portion;

a first slot surrounding the first conductive member;

a second conductive member spaced apart from the first conductive frame and the conductive structure and disposed along the second portion;

a second slot surrounding the second conductive member;

a conductive portion electrically connecting the first conductive frame and the conductive structure and disposed between the first conductive member and the second conductive member;

a wireless communication circuit configured to transmit or receive radio signals of the first frequency band and the second frequency band using at least one of the first slot or the second slot by feeding power to at least one of the first conductive member or the second conductive member;

a first matching circuit electrically connecting the first conductive member with a ground for adjusting the second frequency band; and a second matching circuit electrically connecting the second conductive member with the ground for adjusting the first frequency band.

11. The electronic device of claim 10, wherein the first slot or the second slot is filled with a dielectric material having a specific dielectric constant.

12. The electronic device of claim 10, wherein the first conductive member includes a first feeding point and a first ground point.

13. The electronic device of claim 10, wherein the second conductive member includes a second feeding point and a second ground point.

14. The electronic device of claim 10, wherein the split portion has a width in a range, and wherein the width in the range is 2 millimeters (mm).

15. The electronic device of claim 1, wherein a first slit is formed to surround edges of the first conductive member, and wherein a second slit is formed to surround edges of the second conductive member.

16. The electronic device of claim 15, wherein each of the first slit and the second slit is filled with a dielectric material having a specific dielectric constant.

17. The electronic device of claim 15, wherein the first slit is in contact with the split portion.

18. The electronic device of claim 15, wherein the second slit extends along the first conductive frame to have a first length, wherein the second conductive member extends along the first conductive frame to have a second length, and wherein the second length is greater than or equal to twice the first length.

19. The electronic device of claim 15, wherein the first slit corresponds to an open slot, and wherein the second slit corresponds to a closed slot.

20. The electronic device of claim 15, wherein a length of an edge of the first slit corresponds to a ¼ of a wavelength of radio signals of the first frequency band, and wherein a length of an edge of the second slit corresponds to a ½ of a wavelength of radio signals of the second frequency band.

* * * * *